(12) United States Patent
Takeba

(10) Patent No.: US 8,430,520 B2
(45) Date of Patent: Apr. 30, 2013

(54) ILLUMINATION DEVICE, DISPLAY DEVICE, AND TELEVISION RECEIVER

(75) Inventor: Mitsuhiro Takeba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 207 days.

(21) Appl. No.: 13/140,034

(22) PCT Filed: Aug. 20, 2009

(86) PCT No.: PCT/JP2009/064551
§ 371 (c)(1),
(2), (4) Date: Jun. 16, 2011

(87) PCT Pub. No.: WO2010/073773
PCT Pub. Date: Jul. 1, 2010

(65) Prior Publication Data
US 2011/0249203 A1    Oct. 13, 2011

(30) Foreign Application Priority Data

Dec. 23, 2008 (JP) ................. 2008-326690

(51) Int. Cl.
*G09F 13/04* (2006.01)
*G09F 13/08* (2006.01)

(52) U.S. Cl.
USPC ................... 362/97.2; 362/217.16

(58) Field of Classification Search ........ 362/97.1–97.4, 362/217.1–217.17, 219
See application file for complete search history.

(56) References Cited

FOREIGN PATENT DOCUMENTS

| JP | 2007-033962 A | 2/2007 |
| JP | 2007-322697 A | 12/2007 |

OTHER PUBLICATIONS

Official Communication issued in International Patent Application No. PCT/JP2009/064551, mailed on Dec. 1, 2009.

*Primary Examiner* — Jason Moon Han
(74) *Attorney, Agent, or Firm* — Keating & Bennett, LLP

(57) ABSTRACT

In a lamp clip 30, a locking portion 32 locked from the rear side to the hole edge of a locking hole 41 formed in a chassis 22 through an insertion hole 43 formed in an optical sheet 27 is provided. In the chassis 22, a through-hole 42 having a hole area larger than that of the locking hole 41 is provided continuously from the locking hole 41. The locking portion 32 is allowed to move between a fixed position where the locking portion 32 is located in the locking hole 41 and an attaching and detaching position where the locking portion 32 is located in the through-hole 42. The insertion hole 43 of the optical sheet 27 has a hole area larger than that of the locking hole 41. The optical sheet 27 is allowed to slide from an initial position where the insertion hole 43 communicates with the through-hole 42 in a direction along a moving direction of the locking portion 32.

17 Claims, 40 Drawing Sheets

FIG.1
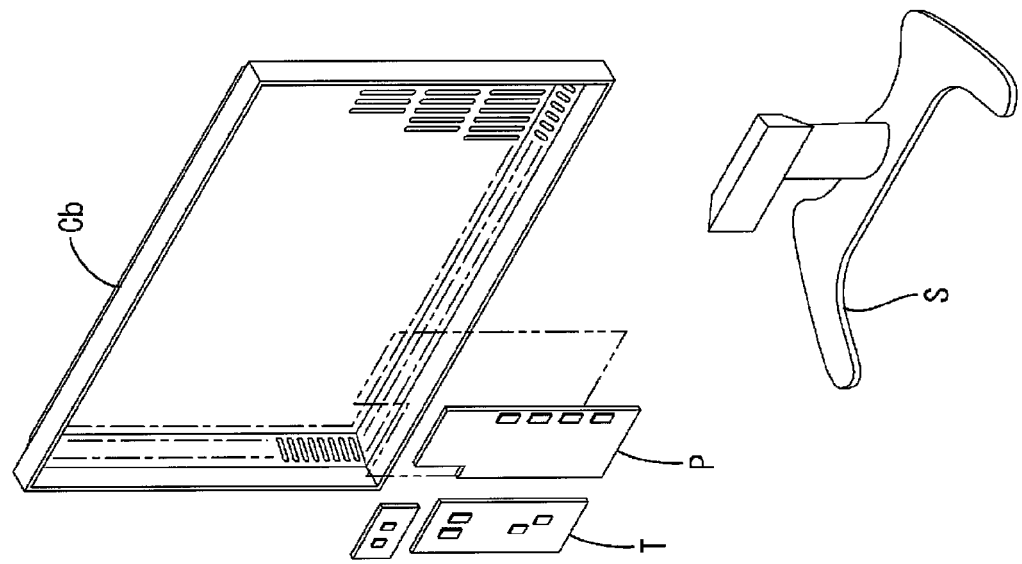
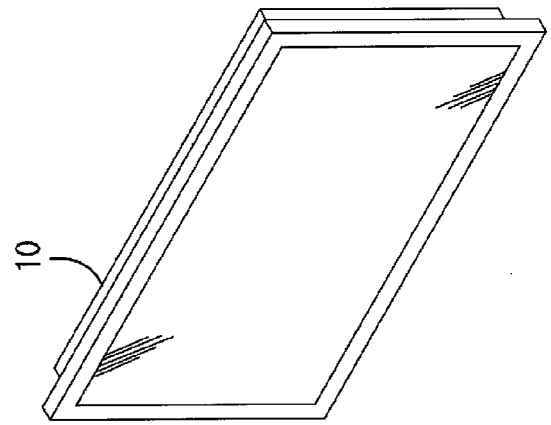
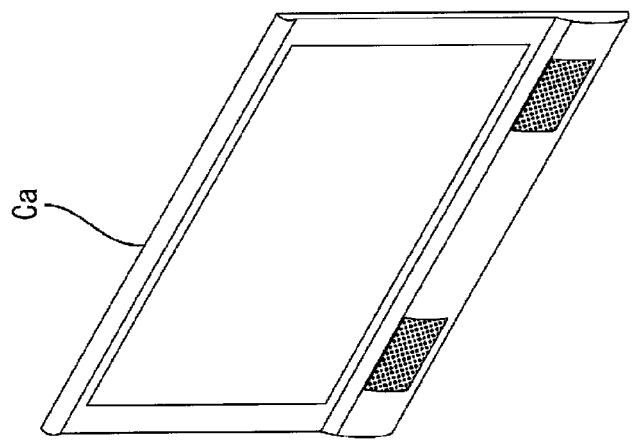

ILLUMINATION DEVICE, DISPLAY DEVICE, AND TELEVISION RECEIVER

TECHNICAL FIELD

The present invention relates to an illumination device, a display device, and a television receiver.

BACKGROUND ART

For example, a display device including a non-self-luminous display panel such as a display device of a liquid crystal television includes, in general, a backlight unit as a device for illumination. As the backlight unit, there is known a backlight unit including a chassis including a reflection sheet on the display panel side (the front side) and a large number of fluorescent tubes (e.g., a cold cathode tube) arranged on the front side of the chassis (e.g., Patent Document 1). Lamp clips for retaining the fluorescent tubes are attached to the chassis of this backlight unit. Locking portions locked from the rear side to hole edges of locking holes formed in the chassis are provided in the lamp clips. The locking portions of the lamp clips are pressed into the locking holes of the chassis from insertion holes formed in the reflection sheet, elastically deformed in a diameter reducing direction by coming into contact with the locking holes, and elastically returned in a diameter expanding direction when the locking portions passes through the locking holes.

[Patent Document 1] Japanese Patent Application Laid-Open Publication No. 2007-33962

Problems to be Solved by the Invention

It is necessary to remove the lamp clips, for example, during replacement work for the reflection sheet performed when the reflection sheet is scratched or during disassembly work for recycling. However, in the case of the structure in which the locking portions of the lamp clips are pressed into the locking holes of the chassis as explained above, there is a problem in that removing work for the lamp clips is not easy.

Specifically, as one of methods of removing the lamp clips, there is a method of pulling the lamp clips with strong force and break the locking portions. However, in this method, since the lamp clips have to be pulled with considerable force, it is not easy to remove the lamp clips. There is a problem in that new lamp clips are necessary during replacement work for the reflection sheet and extra cost is required.

As another method of removing the lamp clips, there is a method of deforming the locking portions from the rear side of the chassis in the diameter reducing direction and causing the locking portions to pass through the locking holes. However, in this method, since a substrate and the like attached to the rear surface of the chassis also have to be removed, it is still not easy to remove the lamp clips. In particular, in recent years, an increase in size of liquid crystal display devices is conspicuous and members required to be removed are also increased in size. Therefore, it is anticipated that the removing work becomes more difficult.

Disclosure of the Invention

The present invention has been completed on the basis of the circumstances explained above and it is an object of the present invention to provide an illumination device, a display device, and a television receiver in which lamp clips can be easily removed.

Means for Solving the Problems

An illumination device of the present invention includes a chassis on which a lamp is arranged on the front side, an optical sheet arranged between the lamp and the chassis, at least one lamp clip retaining the lamp. The lamp clip has at least one locking portion locked to a hole edge of a locking hole formed in the chassis from a rear side through an insertion hole formed in the optical sheet. The chassis has a through-hole formed in a hole size larger than that of the locking hole and continuously from the locking hole. The locking portion is allowed to move between a fixed position where the locking portion is located in the locking hole and an attaching and detaching position where the locking portion is located in the through-hole. The insertion hole of the optical sheet is formed in a hole size larger than that of the locking hole. The optical sheet is allowed to slide in a direction along a moving direction of the locking portion from an initial position where the insertion hole communicates with the locking hole.

According to such a configuration, during removal of the lamp clip, the locking portion can be pulled out to the front side via the through-hole and the insertion hole by sliding the optical sheet from the initial position and moving the lamp clip from the fixed position to the attaching and detaching position. Since the through-hole and the insertion hole have the hole sizes larger than the locking hole, it is easier to pull out the locking portion via the through-hole and the insertion hole than via the locking hole. Therefore, the lamp clip can be easily removed.

BRIEF DESCRIPTION OF THE DRAWINGS

FIG. 1 is a disassembled perspective view showing the schematic configuration of a television receiver according to a first embodiment;

BEST MODE FOR CARRYING OUT THE INVENTION

First Embodiment

A first embodiment embodying the present invention is explained in detail below with reference to FIGS. 1 to 14.

In this embodiment, a television receiver TV including a liquid crystal display device 10 (a display device) is illustrated. The television receiver TV includes, as shown in FIG. 1, the liquid crystal display device 10, cabinets Ca and Cb that house the liquid crystal display device 10 to hold the liquid crystal display device 10 from the front and the back, a power source P, a tuner T for receiving a television broadcast and the like, and a stand S. The liquid crystal display device 10 is housed in the cabinets Ca and Cb in a vertically-placed posture in which a display surface is faced in a substantially vertical direction. In the following explanation, in the component members, the lower left side of FIG. 1 (the front side and the display side of the television receiver TV) is assumed to be front, the upper right side is assumed to be back, the upper side is assumed to be above, and the lower side is assumed to be below.

Figure 2:
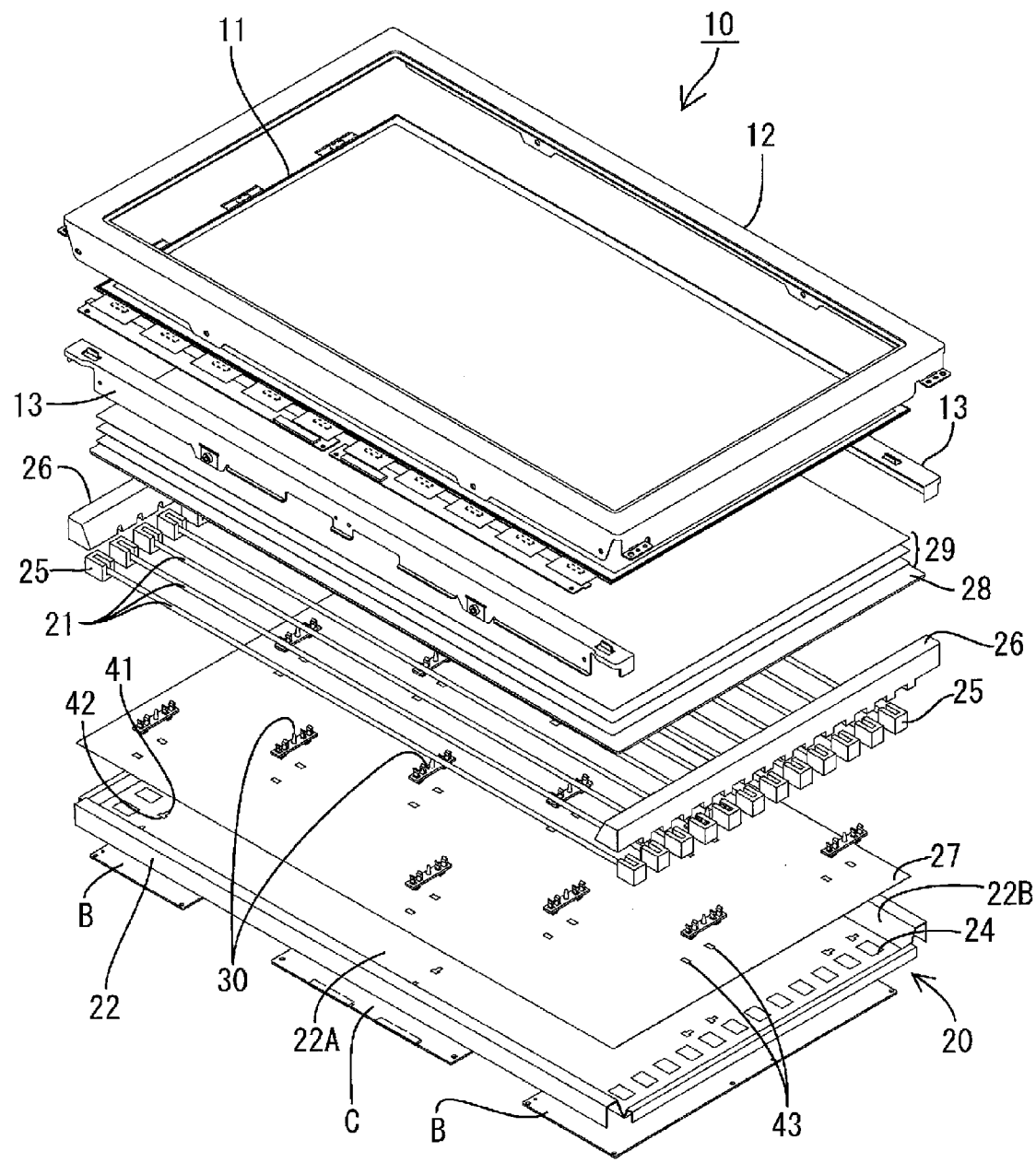
FIG. 2 is a disassembled perspective view showing the schematic configuration of a liquid crystal display device.

The liquid crystal display device 10 includes a liquid crystal panel 11 (corresponding to the display panel of the present invention) that assumes a rectangular shape long sideways as a whole when viewed from the front-back direction and is capable of displaying an image as shown in FIG. 2 and a backlight unit 20 (corresponding to the illumination device of the present invention) as an external light source that irradiates light toward the liquid crystal panel 11. The liquid crystal panel 11 and the backlight unit 20 are integrally retained by a retaining member such as a bezel 12.

The liquid crystal panel 11 includes a pair of transparent substrates of glass (having translucency) that assume a rectangular shape long sideways and a liquid crystal layer (not shown) that is interposed between both the substrates and has an optical characteristic that changes according to voltage application. Polarizing plates 11A and 11B are stuck to the front surface and the rear surface of the liquid crystal panel 11 (see FIGS. 3 and 4).

As shown in FIG. 2, the liquid crystal panel 11 is fixed with the peripheral margin portion held between the bezel 12 arranged on the front side and a frame 13 and a holder 26 arranged on the rear side. The bezel 12 and the frame 13 are made of metal (e.g., aluminum). The bezel 12 assumes a frame shape long sideways along the peripheral margin portion of the liquid crystal panel 11 (surrounding a display area of the liquid crystal panel 11). The frame 13 assumes an elongated shape along an edge extending in a longitudinal direction of the peripheral margin portion of the liquid crystal panel 11. The holder 26 assumes an elongated shape along an edge extending in a lateral direction of the peripheral margin portion of the liquid crystal panel 11.

The backlight unit 20 is the backlight unit 20 of a so-called direct type and is provided right under the rear surface of the liquid crystal panel 11.

Figure 3:
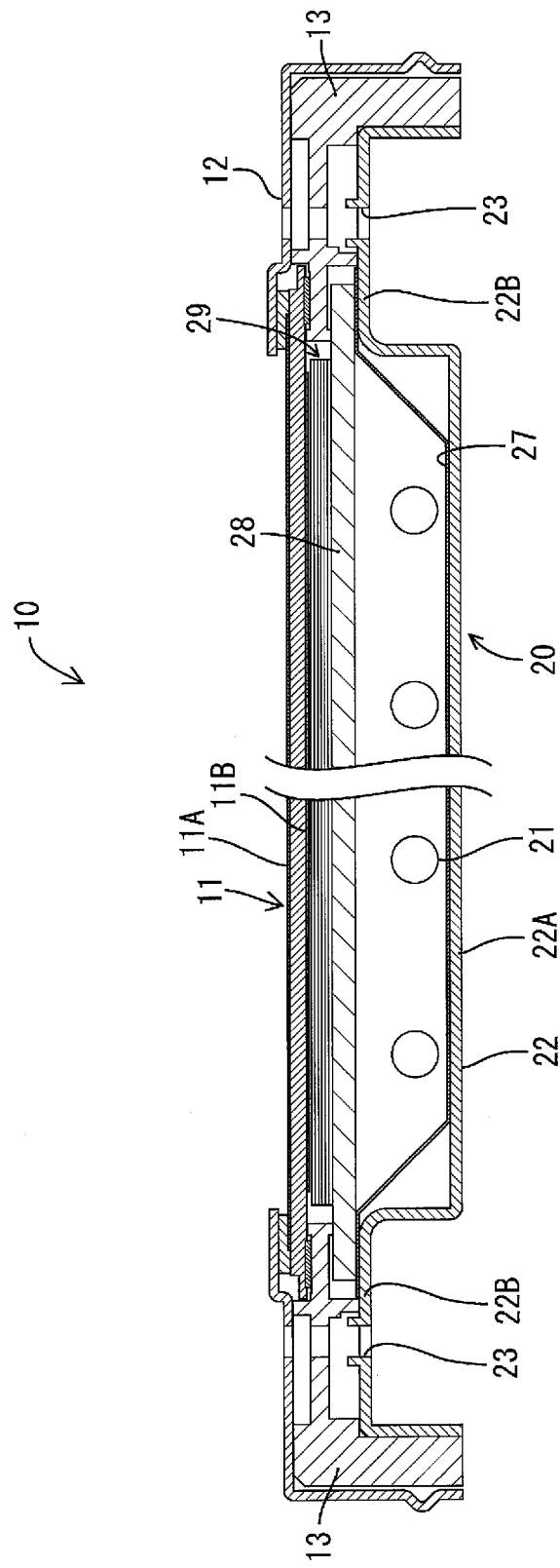
FIG. 3 is a sectional view showing a state in which the liquid crystal display device is taken along a lateral direction.
Figure 4:
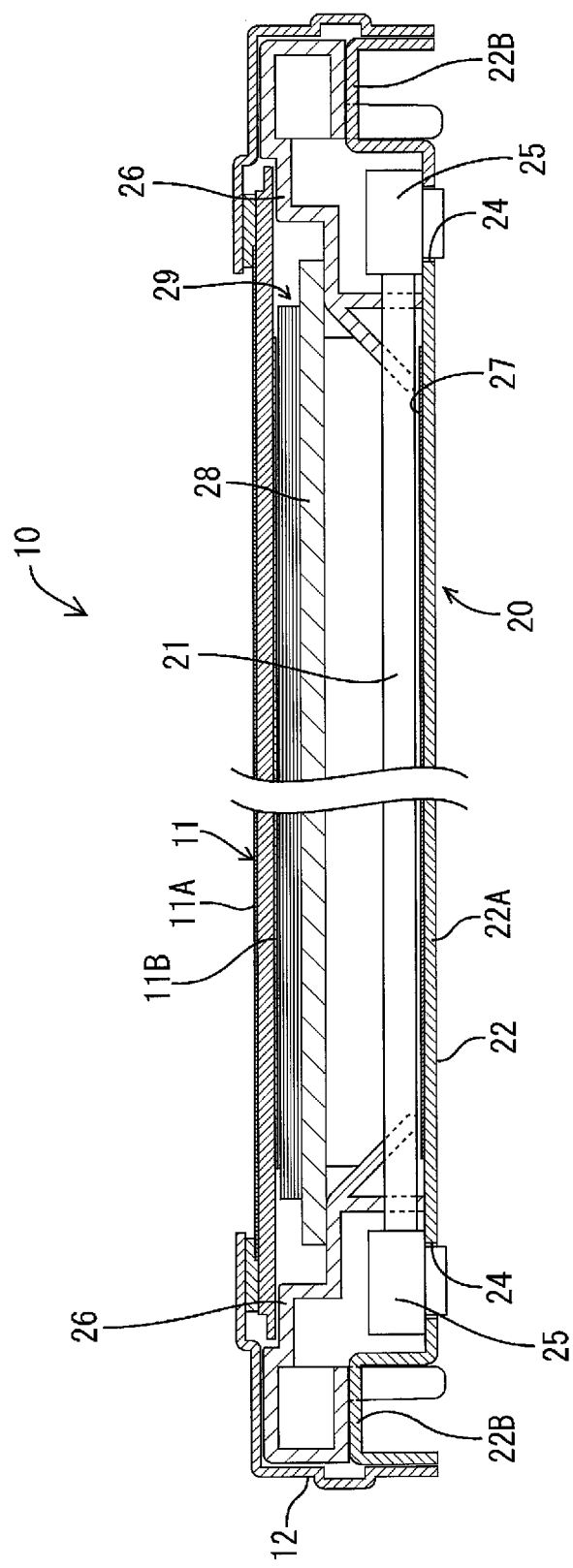
FIG. 4 is a sectional view showing a state in which the liquid crystal display device is taken along a longitudinal direction.

The backlight unit 20 includes a chassis 22 having discharge tubes 21 (corresponding to the lamps of the present invention) arranged on the front side. The chassis 22 is made of metal and includes a bottom wall 22A assuming a flat plate shape and peripheral walls 22B standing from the peripheral margin of the bottom wall 22A to the front side. The chassis 22 as a whole assumes a shallow pan shape opening to the front side. In the peripheral walls 22B of the chassis 22, the bezel 12, and the frame 13, as shown in FIG. 3, fixing holes 23 are formed to pierce through in the front-back direction. Not shown screws are inserted through and tightened to the fixing holes 23, whereby the chassis 22, the bezel 12, and the frame 13 are integrated.

The bottom wall 22A assumes a rectangular shape long sideways larger than the liquid crystal panel 11 in plan view. At both ends in the longitudinal direction of the bottom wall 22A, plural attaching holes 24 for attaching relay connectors 25 explained later are provided to pierce through the bottom wall 22A in the front-back direction (see FIGS. 2 and 4).

Inverter boards B that control driving of the discharge tubes 21 and a control board C that controls driving of the liquid crystal panel 11 are attached to the rear surface of the chassis 22 (see FIG. 2). The inverter boards B are respectively arranged at both ends in the longitudinal direction of the chassis 22 and electrically connected to the relay connectors 25. The control board C is arranged in the center in the longitudinal direction of the chassis 22.

A diffusing plate 28 is arranged in an opening of the chassis 22. The diffusing plate 28 is formed by dispersing and mixing light scattering particles in a tabular member made of synthetic resin and has a function of diffusing light of the discharge tubes 21, which are linear light sources. The diffusing plate 28 assumes a rectangular shape long sideways. Both edges extending in the longitudinal direction of the peripheral margin portion of the diffusing plate 28 are held between the peripheral walls 22B of the chassis 22 and the frame 13 and fixed (see FIG. 3). Both edges extending in the lateral direction of the peripheral margin portion of the diffusing plate 28 are placed on the holder 26 (see FIG. 4).

A sheet-like optical member 29 is provided on the front side of the diffusing plate 28. The optical member 29 is formed by laminating plural sheets having different functions. The sheets are, for example, in order from the rear side, a diffusing sheet, a lens sheet, and a reflective polarizing plate. The optical member 29 is held between the diffusing plate 28 and the liquid crystal panel 11 and retained.

On the surface of the bottom wall 22A of the chassis 22 (between the discharge tubes 21 and the chassis 22), a reflection sheet 27 (corresponding to the optical sheet of the present invention) that reflects light from the discharge tubes 21 to the front side (the diffusing plate 28 side) is laid. The reflection sheet 27 is made of synthetic resin. The surface of the reflection sheet 27 assumes a white color excellent in reflectivity. The reflection sheet 27 assumes a rectangular shape long sideways that covers substantially the entire surface (inner surface) of the bottom wall 22A of the chassis 22 along the surface. As shown in FIG. 3, both edges extending in the longitudinal direction of the peripheral edge of the reflection sheet 27 assume a form standing to cover the front side of the peripheral walls 22B of the chassis 22. Both the edges are held between the chassis 22 and the diffusing plate 28 and fixed.

Plural discharge tubes 21 (in this embodiment, cold cathode tubes) that irradiate light toward the liquid crystal panel 11 are housed on the inside (a portion surrounded by the bottom wall 22A and the peripheral walls 22B) of the chassis 22. The discharge tubes 21 assume an elongated tube shape and are arranged at a fixed space from one another in a direction in which axes of the discharge tubes 21 coincide with the longitudinal direction of the chassis 22. Both ends of the discharge tubes 21 are respectively fit in the relay connectors 25. The middles of the discharge tubes 21 are gripped by lamp clips 30 explained later.

Plural relay connectors 25 are arranged along both end edges in the longitudinal direction of the chassis 22 (see FIG. 2). The relay connectors 25 are collectively covered with the holder 26. The holder 26 is made of synthetic resin assuming a white color and assumes an elongated general box shape.

The backlight unit 20 includes plural lamp clips 30 that retain the discharge tubes 21. The lamp clips 30 are made of synthetic resin (e.g., polycarbonate). The surfaces of the lamp clips are colored white excellent in reflectivity of light. Each of the lamp clips 30 includes lamp gripping portions 31 that grip the discharge tubes 21, the locking portions 32 that are locked to the rear surface of the chassis 22, and the base part 33 that holds the chassis 22 and the reflection sheet 27 between the base part 33 and the locking portions 32 (see FIG. 8).

The base part 33 assumes an elongated substantially rectangular plate shape. A support pin 34 that supports the diffusing plate 28 from the rear side is provided to protrude to the front side in substantially the center position in the longitudinal direction of the base part 33. The support pin 34 assumes a substantially conical shape having a radial dimension gradually decreasing toward the protruding end. A protrusion dimension of the support pin 34 is set larger than a protrusion dimension of the lamp gripping portions 31. This support pin 34 regulates a bend or a warp of the diffusing plate 28 to the rear side (the discharge tube 21 side).

A pair of lamp gripping portions 31 are provided at both ends in the longitudinal direction of the base part 33. A space between the pair of lamp gripping portions 31 coincides with a parallel arrangement pitch of the discharge tubes 21.

Each of the lamp gripping portions 31 includes a pair of arm portions 31A that hold the discharge tube 21. The lamp gripping portion 31 as a whole assumes a substantially annular shape opening to the front side. The pair of arm portions 31A stand from the base part 33 to the front side in a cantilever shape and is formed elastically deformable in a direction in which the pair of arm portions 31A approach and separate from each other. The lamp gripping portion 31 is provided in a direction in which an opposing direction of the pair of arm portions 31A coincides with the longitudinal direction of the base part 33. The arm portions 31A are curved in a substantially arcuate shape.

A pair of retaining protrusions 31B protruding inward are provided in positions closer to the distal ends of the pair of arm portions 31A. The pair of retaining protrusions 31B are set in contact with substantially a half on the front side of the discharge tubes 21 gripped by the lamp gripping portion 31.

Opposed surfaces at the distal ends (ends further on the front side than the retaining protrusions 31B) of the pair of arm portions 31A are guide surfaces 31C that tilt to widen a space between the opposed surfaces toward the distal end. An attaching operation for the discharge tubes 21 is guided by the guide surfaces 31C.

A pair of locking portions 32 are provided on the rear surface of the base part 33 at both ends in the longitudinal direction of the base part 33 (positions right behind the pair of lamp gripping portions 31).

Each of the locking portions 32 includes a base portion 32A protruding from the base part 33 to the rear side and a pair of locking legs 32B protruding to the rear side from the base portion 32A in a cantilever shape.

The base portion 32A of the locking portion 32 assumes a pillar shape substantially rectangular in section. An axial direction dimension (a front-back direction dimension) of the base portion 32A is slightly smaller than a dimension obtained by adding up the thickness dimension of the chassis 22 and the thickness dimension of the reflection sheet 27 (see FIGS. 10 and 12). The base portion 32A of the locking portion 32 is located in the center in the opposing direction of the pair of arm portions 31A of the lamp gripping portion 31 (see FIGS. 13 and 14).

Figure 10:
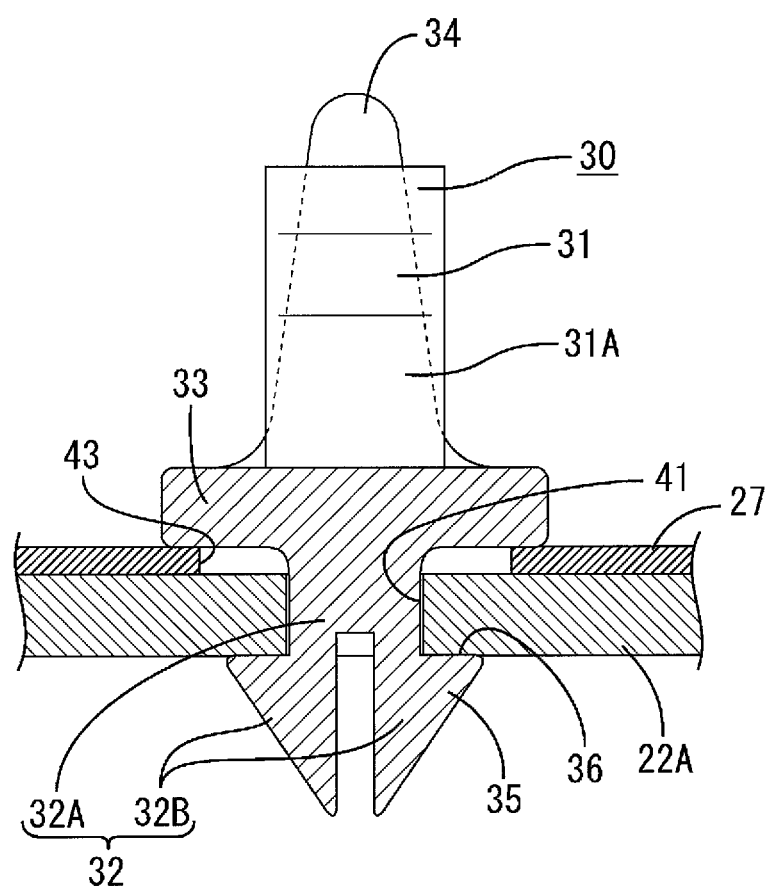
FIG. 10 is an A-A sectional view of FIG. 9.
Figure 12:
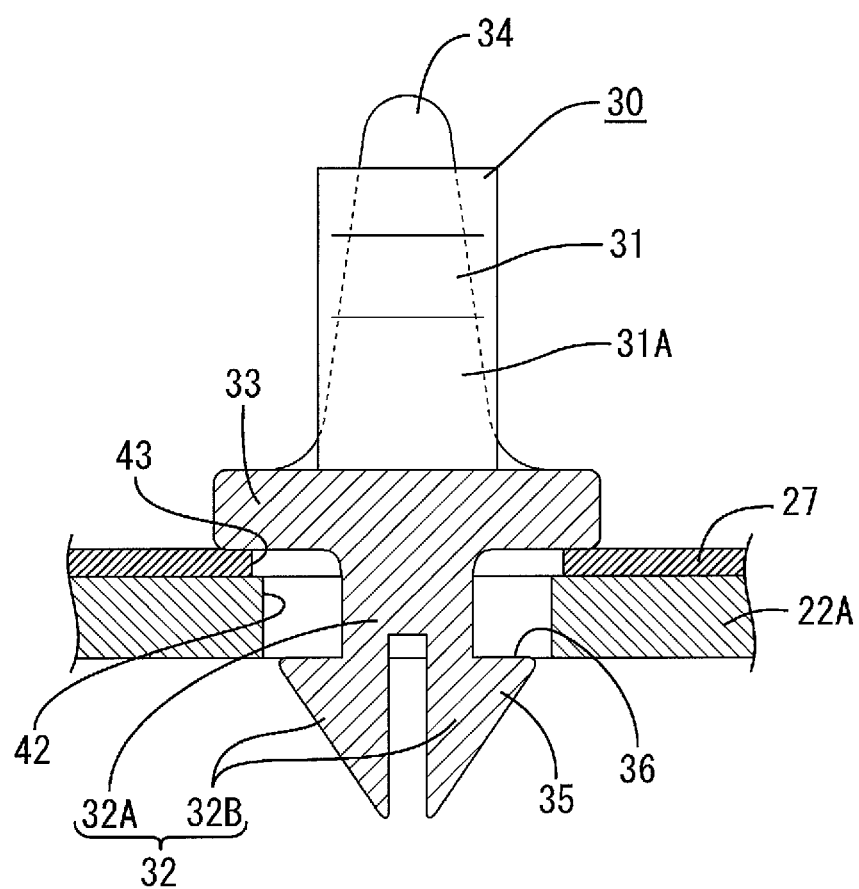
FIG. 12 is a B-B sectional view of FIG. 11.
Figure 13:
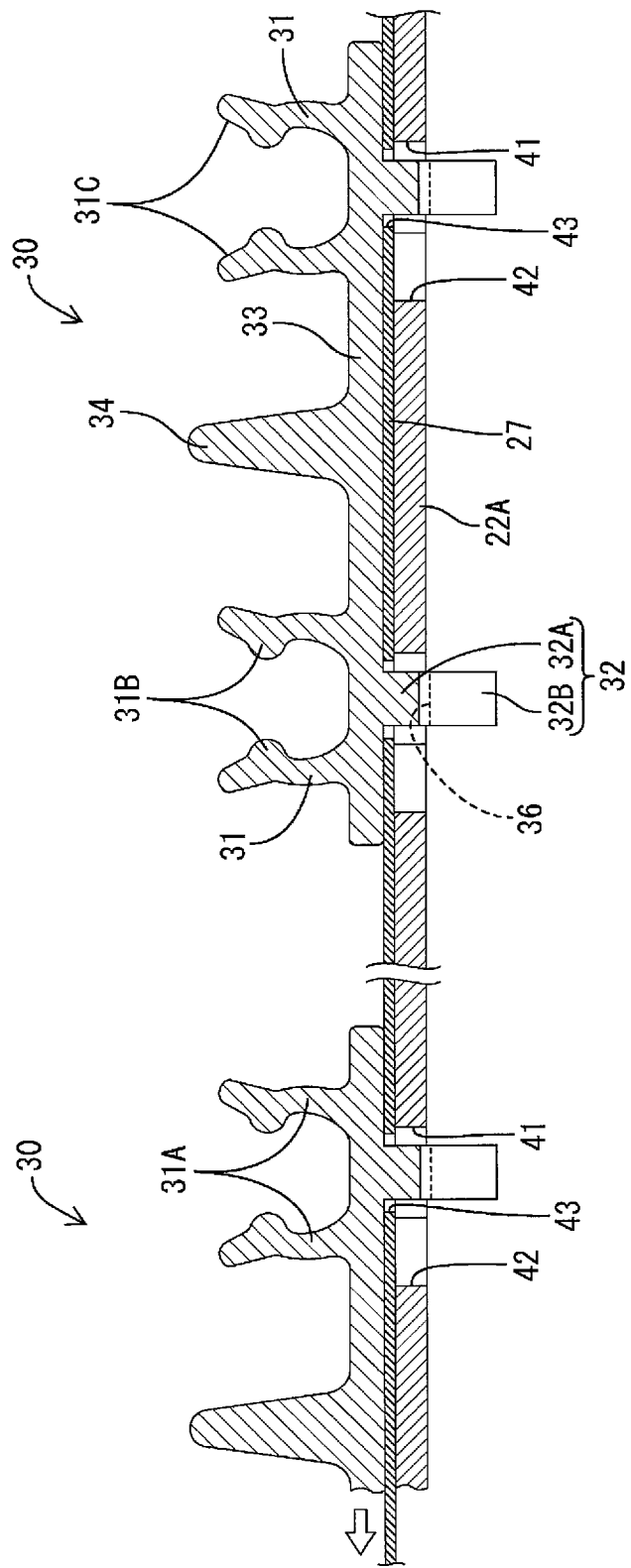
FIG. 13 is a partially enlarged sectional view showing a state in which plural lamp clips are arranged in the fixed position and the reflection sheet is arranged in the initial position.
Figure 14:
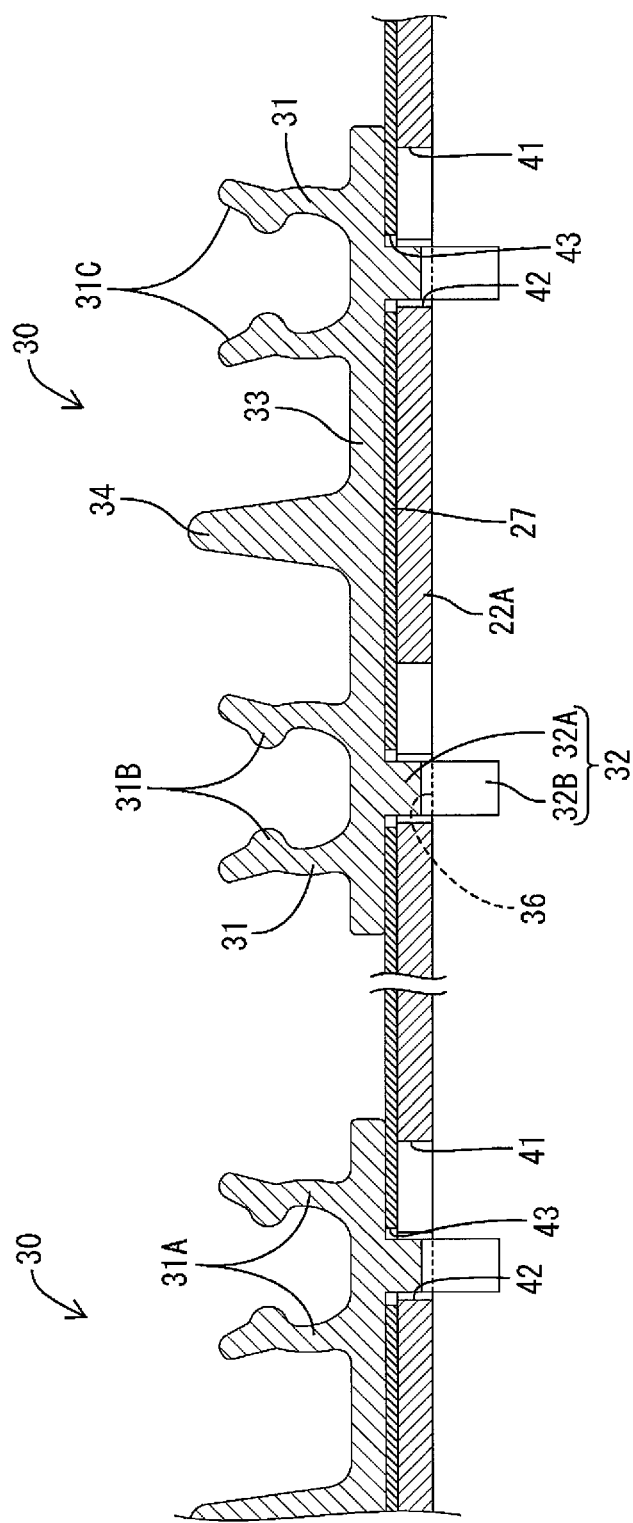
FIG. 14 is a partially enlarged sectional view showing a state in which the plural lamp clips are arranged in the attaching and detaching position and the reflection sheet is arranged in the end position.

The pair of locking legs 32B are opposed to each other and protrude to the rear side from the rear surface of the base portion 32A (see FIGS. 10 and 12). The pair of locking legs 32B are provided at a predetermined space from each other and are elastically displaceable in a direction in which the locking legs 32B approach and separate from each other (the lateral direction of the base part 33).

The distal ends of the pair of locking legs 32B are projecting portions 35 that project to the outer side. The projecting portions 35 assume a wedge shape pointed toward the distal ends when viewed from the longitudinal direction of the base part 33. The width dimension of both the locking legs 32B (the width dimension in a direction along the longitudinal direction of the base part 33) is equal to the width dimension in the same direction of the base portion 32A and is substantially fixed from the base to the distal end.

Figure 11:
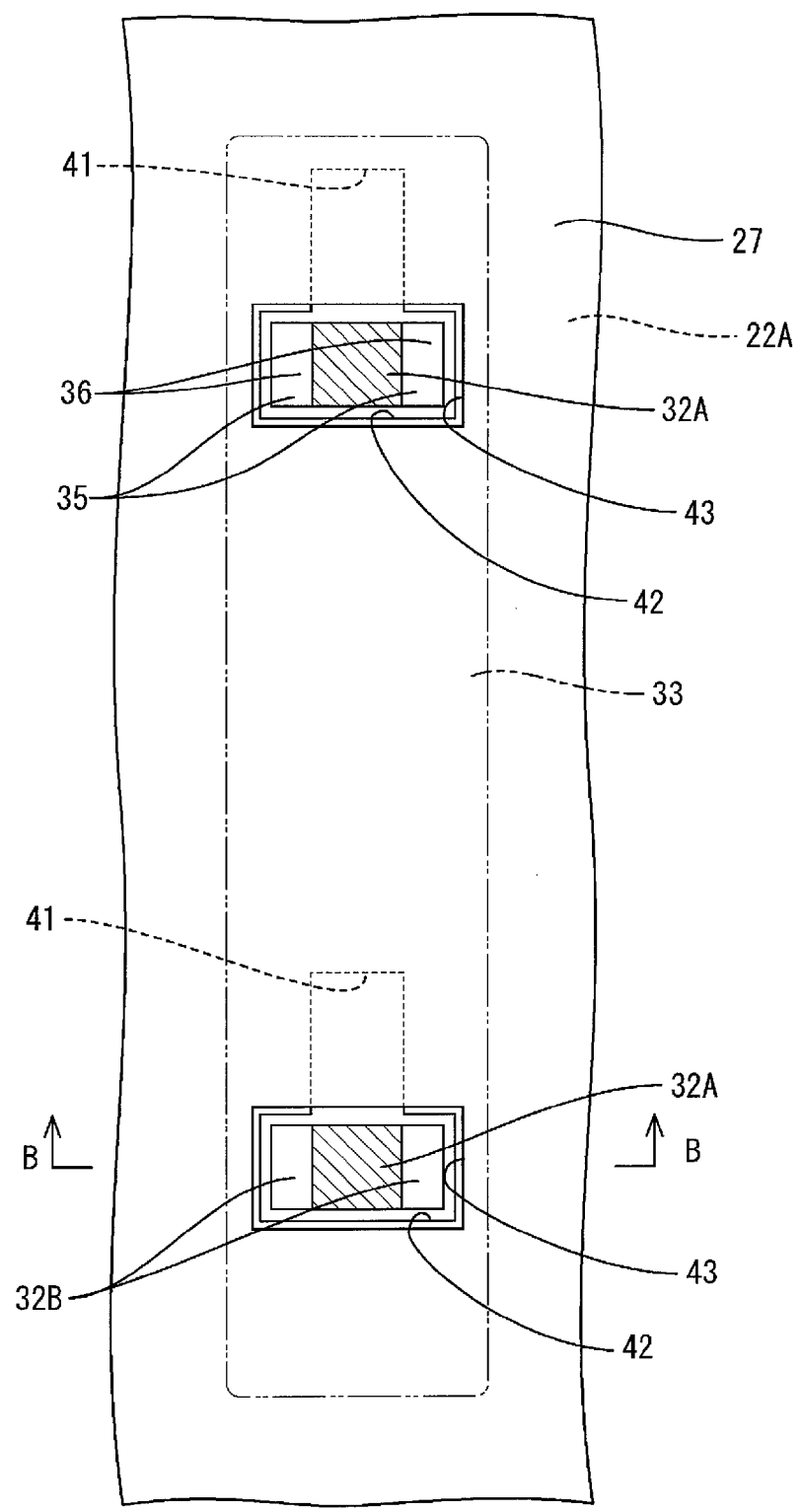
FIG. 11 is a partially enlarged plan sectional view showing a state in which the lamp clip is arranged in an attaching and detaching position and the reflection sheet is arranged in an end position.

Locking surfaces 36 locked to the rear surface of the chassis 22 are formed in the pair of locking legs 32B. The locking surfaces 36 are front side surfaces of the projecting portions 35 and are substantially parallel to the rear surface of the base part 33 (see FIGS. 10 and 12). A dimension equivalent to a dimension obtained by adding up the thickness dimension of the chassis 22 and the thickness dimension of the reflection sheet 27 is opened between the locking surfaces 36 and the base part 33. In a natural state of the locking portions 32 (a state in which the locking legs 32B are not elastically deformed), the locking surfaces 36 project in symmetrical directions from the base portion 32A. As shown in FIG. 11, the pair of locking surfaces 36 and the base portion 32A assume a substantially rectangular shape long in the lateral direction of the base part 33.

Figure 5:
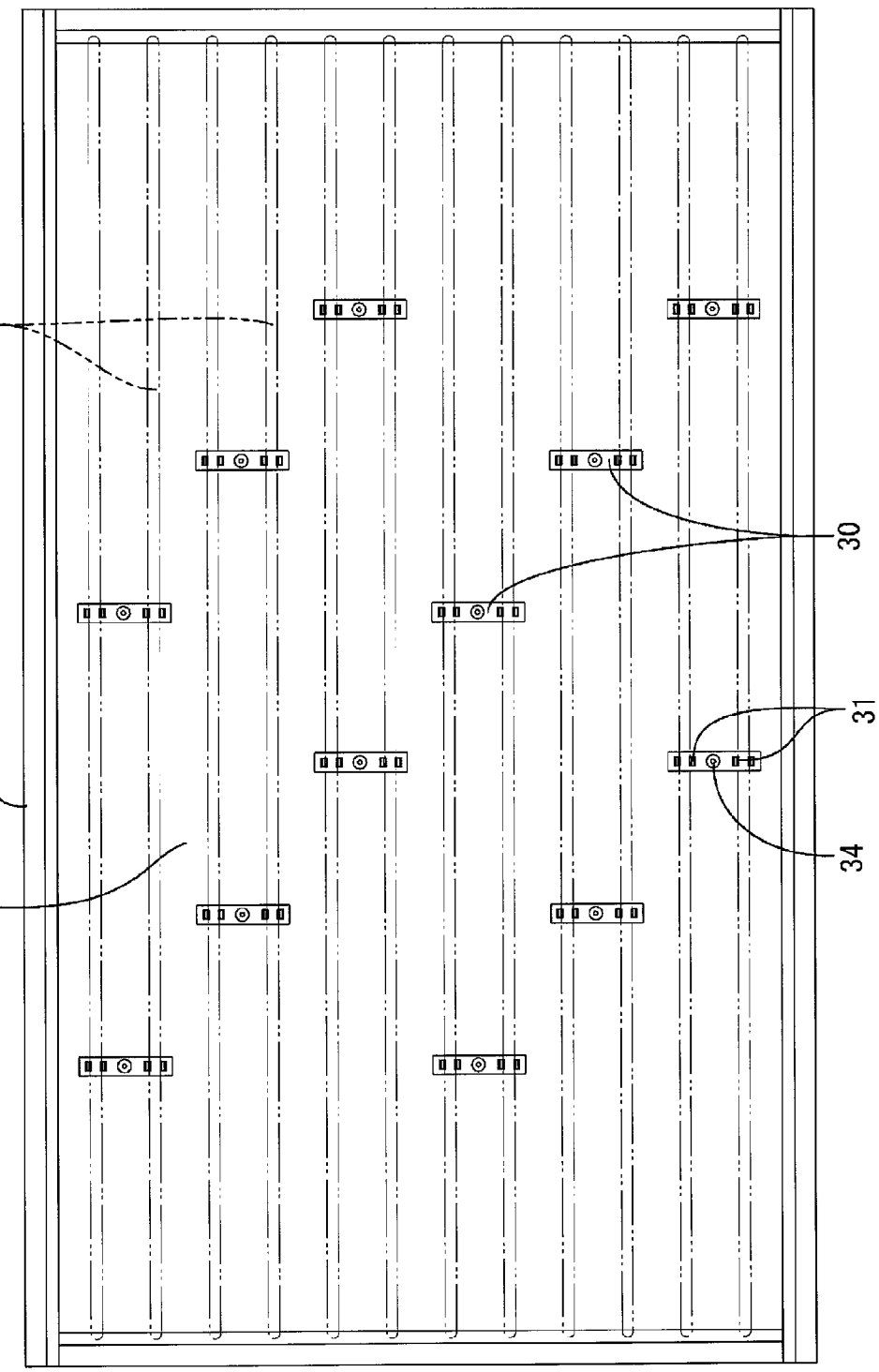
FIG. 5 is a plan view showing a state in which a lamp clip is attached to a chassis.

As shown in FIG. 5, all the lamp clips 30 are attached to be dispersed in the middle portion in the longitudinal direction of the chassis 22 in a direction in which the longitudinal direction of the base part 33 coincides with the parallel arrangement direction of the discharge tubes 21 (substantially orthogonal to the axial direction of the discharge tubes 21).

Figure 7:
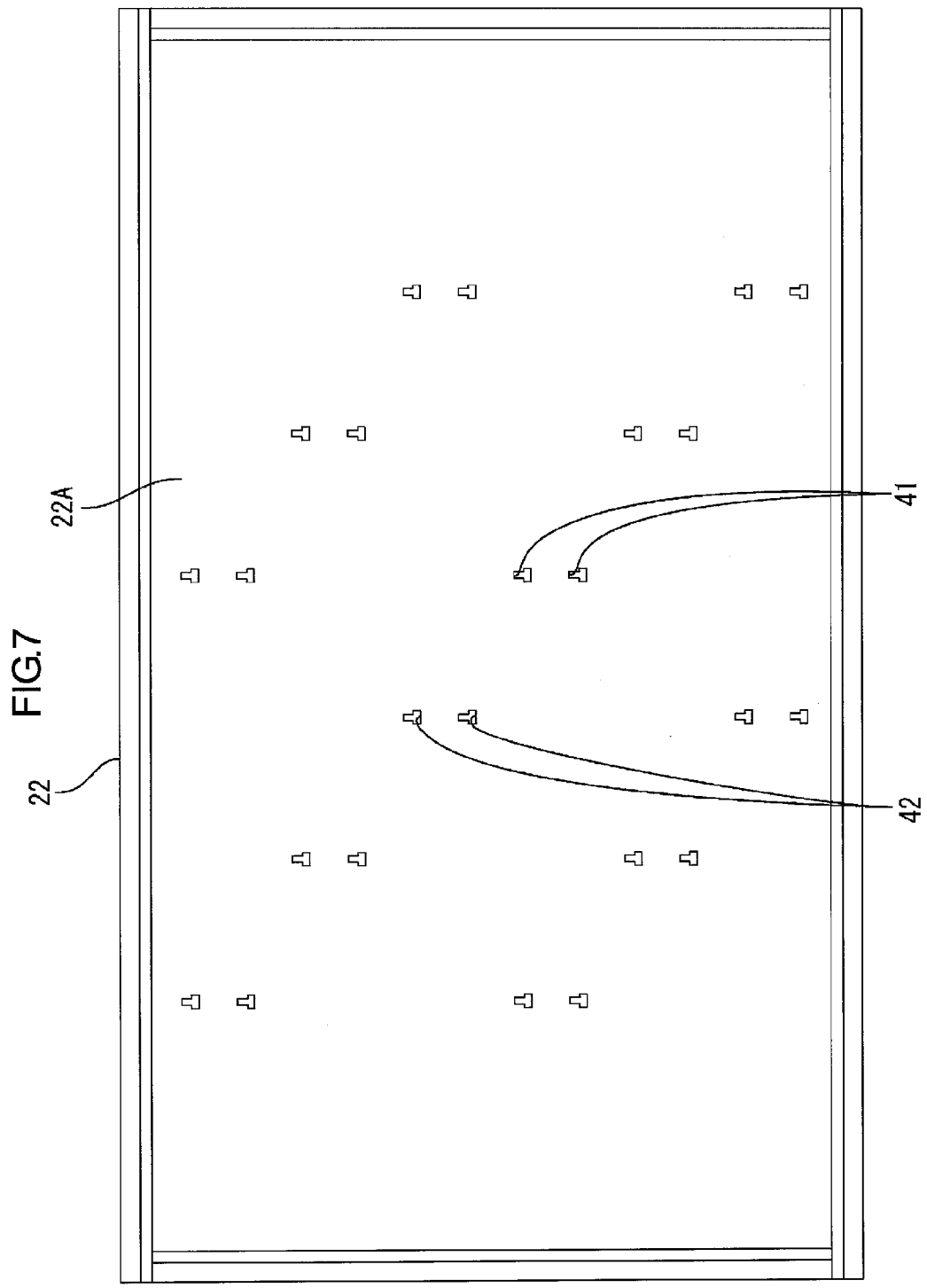
FIG. 7 is a plan view of the chassis.
Figure 8:
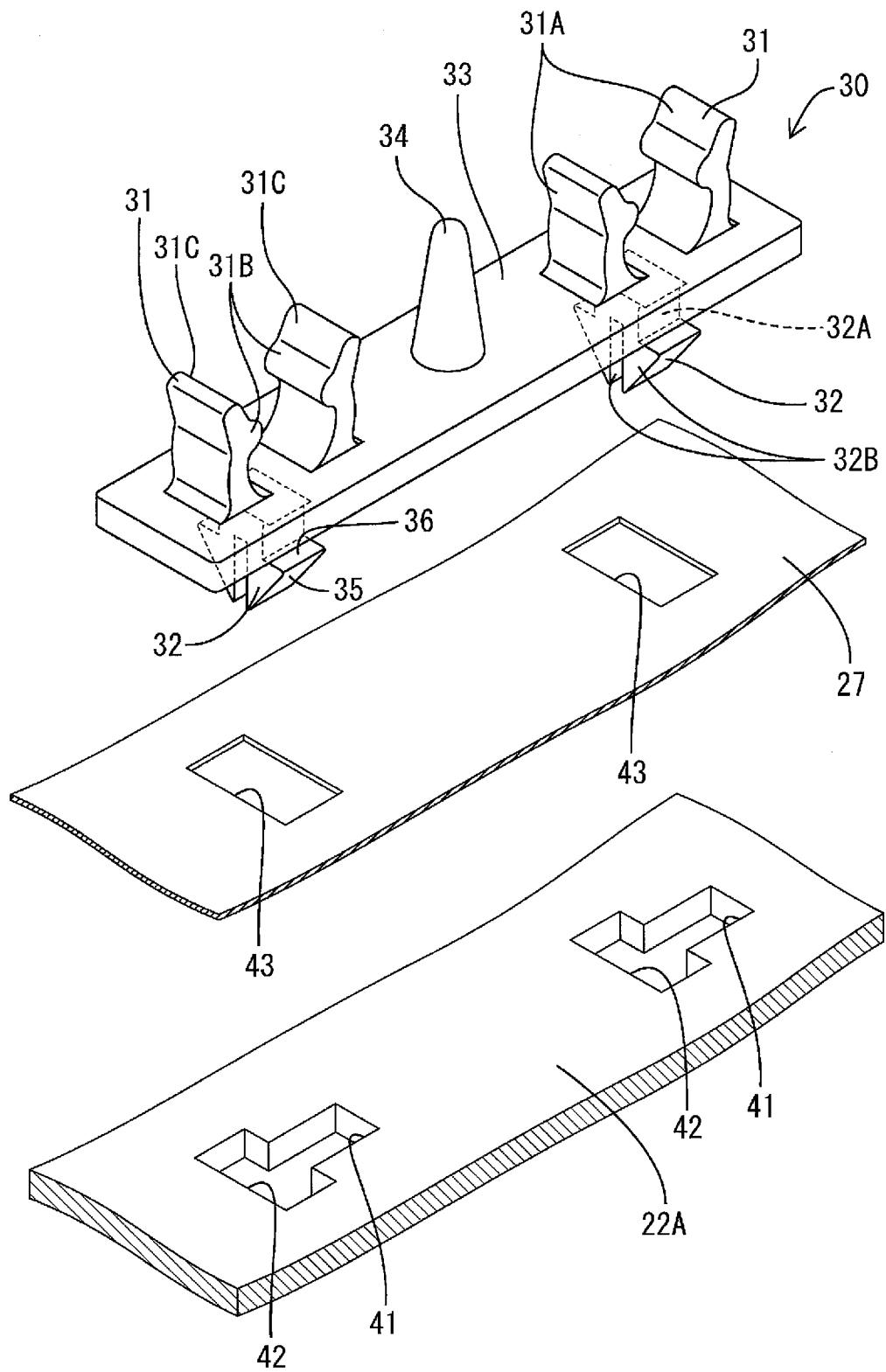
FIG. 8 is a partially enlarged perspective view of the lamp clip, the reflection sheet, and the chassis.

Locking holes 41 in which the locking portions 32 of the lamp clips 30 are locked are provided in the bottom wall 22A of the chassis 22 (see FIG. 7). The locking holes 41 are formed to pierce through the bottom wall 22A in the front-back direction in attaching positions of the lamp clips 30 of the bottom wall 22A of the chassis 22. Two locking holes 41 are arranged for one lamp clip 30 at a space equal to a space between a pair of locking portions 32 of each of the lamp clips 30.

Figure 9:
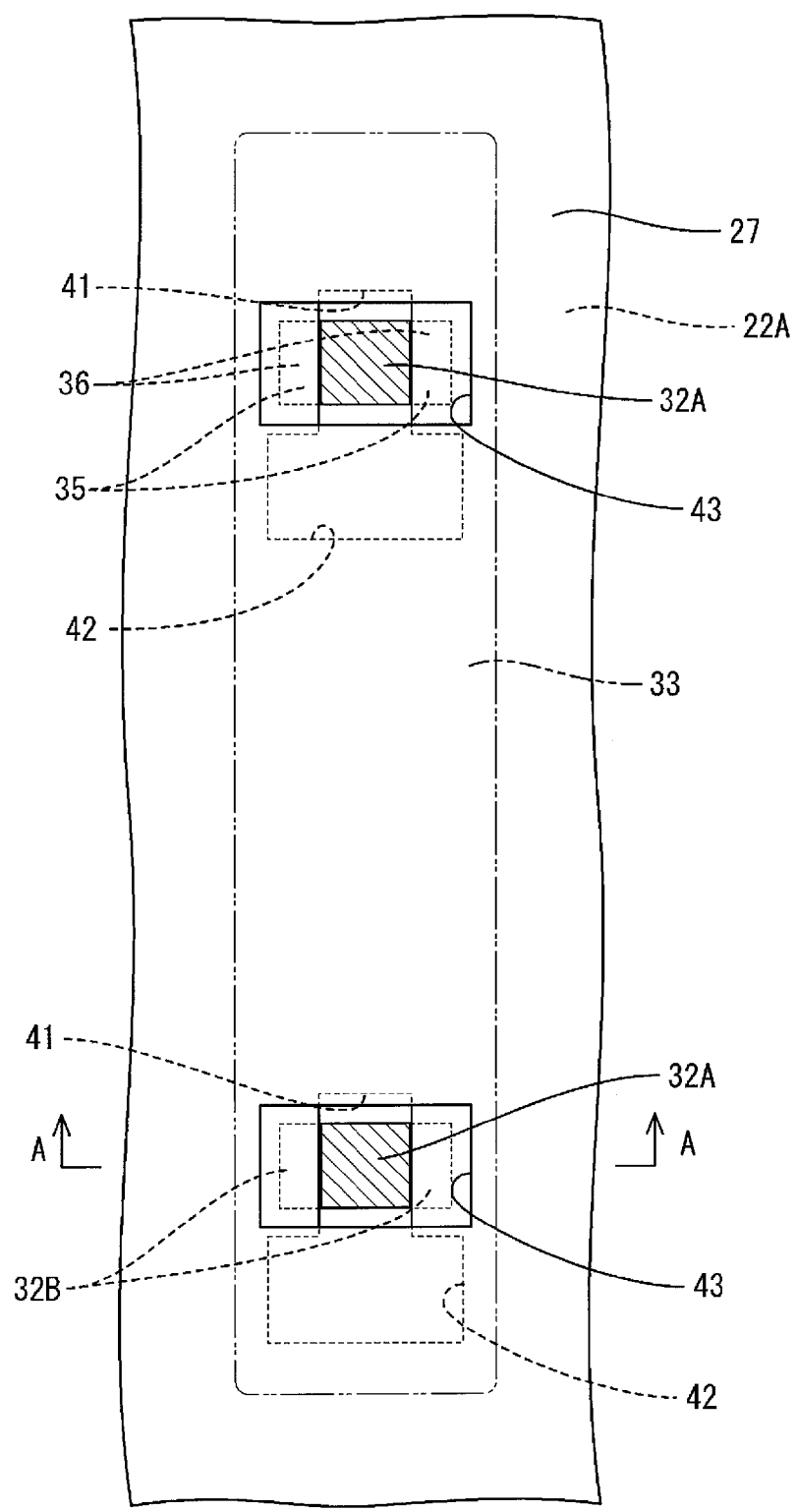
FIG. 9 is a partially enlarged plan sectional view showing a state in which the lamp clip is arranged in a fixed position and the reflection sheet is arranged in an initial position.

All the locking holes 41 are formed in substantially the same shape and same size and assume a rectangular shape slightly long in the up-down direction (the lateral direction of the chassis 22). As shown in FIGS. 9 and 10, the width dimension in the lateral direction of the locking holes 41 is set to a dimension substantially the same as the width dimension of the base portions 32A of the locking portions 32 (the width dimension in the opposing direction of the locking legs 32B). The locking surfaces 36 of the locking portions 32 are locked from the rear side to both edges opposed in the lateral direction of the locking holes 41 of the hole edges of the locking holes 41.

Through-holes 42 having a hole area larger than that of the locking holes 41 are provided in the chassis 22. The through-holes 42 are provided continuously to the locking holes 41. The locking portions 32 of the lamp clips 30 are allowed to move between a fixed position where the locking portions 32 are located in the locking holes 41 and an attaching and detaching position where the locking portions 32 are located in the through-holes 42. The through-holes 42 are provided to correspond to all the locking holes 41. All the through-holes 42 are formed in substantially the same shape and same size. The through-holes 42 are set to size for allowing the locking portions 32 to pass in the front-back direction without deforming the locking portions 32 to be reduced in diameter, i.e., without deforming the locking legs 32B in the approaching direction. In other words, the through-holes 42 are set to size larger than the external shape of the locking portions 32 in the natural state in plan view (see FIG. 11).

The through-holes 42 assume a substantially rectangular shape long in the longitudinal direction of the chassis 22. As shown in FIG. 9, the width dimension in the longitudinal direction of the through-holes 42 is set smaller than the width dimension in the lateral dimension of the base part 33. The width dimension in the lateral direction of the through-hole 42 is set smaller than a dimension from an end edge in the longitudinal direction of the base part 33 to the locking portions 32. In a state in which the locking portions 32 are in the fixed position, all the through-holes 42 are arranged in a projection surface of the base part 33 on the chassis 22 (see FIG. 9). Even in a state in which the locking portions 32 are in the attaching and detaching position, all the through-holes 42 are arranged in the projection surface of the base part 33 on the chassis 22 (see FIG. 11).

All the through-holes 42 are formed under the locking holes 41. The through-holes 42 assume a form more expanded in width by the same dimension in the left-right direction (the longitudinal direction of the chassis 22) than the locking holes 41. The locking portions 32 of all the lamp clips 30 move downward to reach from the fixed position to the attaching and detaching position and moves upward to reach from the attaching and detaching position to the fixed position. Movement amounts between the fixed position and attaching and detaching position of all the locking portions 32 are the same.

Insertion holes 43 for inserting the locking portions 32 in the front-back direction are formed to pierce through the reflection sheet 27.

Figure 6:
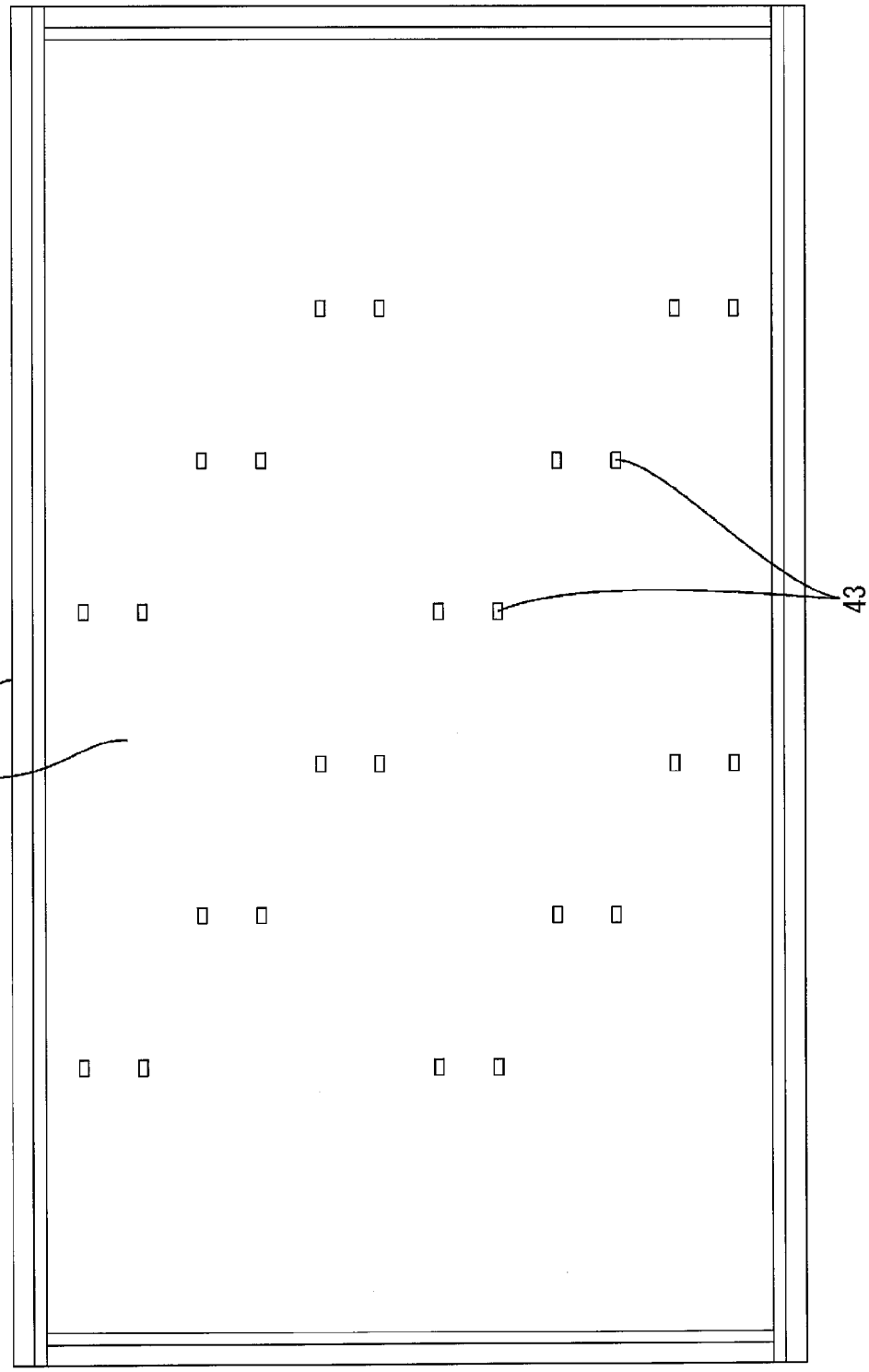
FIG. 6 is a plan view showing a state in which a reflection sheet is arranged in the chassis.

The insertion holes 43 are formed in attaching positions of the lamp clips 30 of the reflection sheet 27 (see FIG. 6). Two insertion holes 43 are provided for one lamp clip 30 at a space equal to the space of the pair of locking portions 32 of each of the lamp clips 30.

All the insertion holes 43 are formed in substantially the same shape and size and assume a rectangular shape larger than the locking holes 41 and slightly long in the left-right direction (the longitudinal direction of the chassis 22). Like the through-holes 42, the insertion holes 43 are set to size for allowing the locking portions 32 to pass in the front-back direction without deforming the locking portions 32 to be reduced in diameter, i.e., without deforming the locking legs 32B in the approaching direction. A pair of edges extending in the longitudinal direction of the hole edges of the insertion holes 43 (a pair of edges opposed in the slide direction of the reflection sheet 27) are located along the outer edges of the base portions 32A of the locking portions 32 inserted through the insertion holes 43 (see FIGS. 9 and 11).

The reflection sheet 27 is allowed to slide in a direction along the moving direction of the locking portions 32 from the initial position where the insertion holes 43 communicate with the locking holes 41. The reflection sheet 27 moves downward from the initial position and reaches a position where the insertion holes 43 communicate with the through-holes 42 (referred to as an end position). When the reflection sheet 27 is in the initial position, as shown in FIG. 9, the insertion holes 43 are arranged to be shifted from the through-holes 42, regulate the locking portions 32 from passing in the front-back direction, and prevent the locking portions 32 from moving to the through-holes 42 side to be carelessly detached. When the reflection sheet 27 is in the end position, as shown in FIG. 11, the insertion holes 43 communicate with the through-holes 42 and permit the locking portions 32 to pass in the front-back direction. When the reflection sheet 27 is in the end position, all the insertion holes 43 communicate with all the through-holes 42. When the reflection sheet 27 is in the initial position, all the insertion holes 43 are shifted from all the through-holes 42.

Assembly work for the liquid crystal display device 10, in particular, attaching work for the lamp clips 30 is explained in detail below.

First, the reflection sheet 27 is arranged on the front side of the chassis 22. Specifically, the reflection sheet 27 is aligned and arranged in the initial position such that the insertion holes 43 are arranged on the front side of the locking holes 41.

Subsequently, the lamp clips 30 are attached in order. Each of the lamp clips 30 is aligned such that a pair of locking portions 32 are respectively opposed to the insertion holes 43 of the reflection sheet 27. The lamp clip 30 is brought close to the chassis 22 side. Then, the locking legs 32B of the locking portions 32 pass through the insertion holes 43 and come into contact with the hole edges of the locking holes 41. When the lamp clip 30 is pushed in, since the locking legs 32 are pressed against the hole edges of the locking holes 41, the locking legs 32 are elastically deformed in the diameter reducing direction and inserted into the locking holes 41. Before long, the locking legs 32 protrude to the rear side of the chassis 22. At the same time, the locking legs 32 elastically return. An entire pair of locking surfaces 36 are arranged on the rear side of the locking edges of the locking holes 41 (a locked state). In this way, all the lamp clips 30 are attached to the chassis 22 in an unremovable state.

Thereafter, the discharge tubes 21 are attached to the chassis 22 in order. Both ends of each of the discharge tubes 21 are respectively fit to the relay connectors 25. The middle of the discharge tube 21 is gripped by the lamp gripping portions 31 of each of the lamp clips 30.

Subsequently, the relay connectors 25 are covered with the holder 26 and the diffusing plate 28 and the optical member 29 are placed in the opening of the chassis 22. A pair of frames 13 are set in predetermined positions. The liquid crystal panel 11 and the bezel 12 separately manufactured are placed on the front side of the frames 13 in order. The bezel 12, the frames 13, and the chassis 22 are screwed and integrated. In this way, assembly of the liquid crystal display device 10 is completed.

Disassembly work for the liquid crystal display device 10, in particular, removing work for the lamp clips 30 is explained in detail below.

First, the screws that fix the bezel 12, the frames 13, and the chassis 22 are unscrewed to remove the bezel 12, the liquid crystal panel 11, the frames 13, the optical member 29, the diffusing plate 28, and the holder 26 in order.

Subsequently, the discharge tubes 21 are removed from the chassis 22 in order. Both ends of each of the discharge tubes 21 are respectively detached from the relay connectors 25. The middle of the discharge tube 21 is removed from the lamp gripping portions 31 of each of the lamp clips 30.

Subsequently, the reflection sheet 27 is slid from the initial position to the lower side (the end position side). At this point, the upper edges of the insertion holes 43 (edges on the rear side in the slide direction to the end position side of the hole edges of the insertion holes 43) are located along the upper edges of the base portions 32A of the locking portions 32 in the fixed position (edges on the rear side in the moving direction to the attaching and detaching position side of the outer edges of the base portions 32A). Therefore, the upper edges of all the insertion holes 43 come into contact with the upper edges of the base portions 32A of the locking portions 32 immediately after the start of the slide of the reflection sheet 27 and press the base portions 32A to the lower side (the attaching and detaching position side) according to the further slide of the reflection sheet 27. The base portions 32A of the locking portions 32 move from the locking holes 41 to the through-holes 42 side. The locking surfaces 36 of the locking portions 32 are exposed from the rear side of the chassis 22 little by little. Before long, the reflection sheet 27 reaches the end position and the insertion holes 43 move to the front side of the through-holes 42 and communicate with the entire through-holes 42. The lamp clip 30 reaches the attaching and detaching position, the entire base portions 32A of the locking portions 32 move to the through-holes 42, and an entire pair of locking surfaces 36 face the front side from the through-holes 42 (an unlocked state). In this way, all the lamp clips 30 are detachable from the chassis 22.

The lamp clips 30 are removed from the chassis 22 in order. When the support pins 34 of the lamp clips 30 are pinched by finger tips and pulled to the front side, the locking portions 32 smoothly pass through the insertion holes 43 from the through-holes 42 without being elastically deformed and are removed from the chassis 22. In this way, the disassembly work for the liquid crystal display device 10 ends.

Actions and Effects of this Embodiment Configured as Explained Above are Explained Below.

In the lamp clip 30, the locking portions 32 locked from the rear side to the hole edges of the locking holes 41 formed in the chassis 22 through the insertion holes 43 formed in the reflection sheet 27 are provided. In the chassis 22, the through-holes 42 having a hole area larger than that of the locking holes 41 are provided continuously from the locking holes 41. The locking portions 32 are allowed to move between the fixed position where the locking portions 32 are located in the locking holes 41 and the attaching and detaching positions where the locking portions 32 are located in the through-holes 42. The insertion holes 43 of the reflection sheet 27 have a hole area larger than that of the locking holes 41. The reflection sheet 27 is allowed to slide in the direction along the moving direction of the locking portions 32 from the initial position where the insertion holes 43 communicate with the locking holes 41.

Consequently, when the lamp clip 30 is removed, the reflection sheet 27 is slid from the initial position and the locking portions 32 are moved from the fixed position to the attaching and detaching position, whereby the locking portions 32 can be pulled out to the front side from the through-holes 42 and the insertion holes 43. Since the through-holes 42 and the insertion holes 43 have hole areas larger than the locking holes 41, it is easy to pull out the locking portions 32 compared with the case in which locking portions are pulled out from locking holes as in the past. Therefore, it is possible to easily remove the lamp clip 30.

In all the lamp clips 30, edges on the rear side in the slide direction of the hole edges of the insertion holes 43 of the reflection sheet 27 arranged in the initial position are set to be located along the edges on the rear side in the moving direction to the attaching and detaching position side of the outer edges of the locking portions 32 arranged in the fixed position. Consequently, when it is attempted to slide the reflection sheet 27 from the initial position, the hole edges of the insertion holes 43 come into contact with the outer edges of the locking portions 32 immediately after the slide. The reflection sheet 27 is slid as it is, whereby the locking portions 32 can be moved to the attaching and detaching position side. Therefore, when the lamp clips 30 are moved from the fixed position to the attaching and detaching position according to the slide of the reflection sheet 27 (when the lamp clips 30 are removed), it is possible to reduce a slide amount of the reflection sheet 27 until the hole edges of the insertion holes 43 come into contact with the outer edges of the locking portions 32.

In a state in which the lamp clips 30 are in the fixed position, the through-holes 42 of the chassis 22 are arranged in the projection surface of the base part 33 on the chassis 22. Consequently, it is possible to prevent the light of the discharge tubes 21 from the through-holes 42 of the chassis 22.

The through-holes 42 and the insertion holes 43 are set to size for allowing the locking portions 32 to pass in the front-back direction without deforming the locking portions 32 to be reduced in diameter. Consequently, when the locking portions 32 are pulled out, compared with the case in which the locking portions 32 have to be deformed to be reduced in diameter even a little, force required to pull out the lamp clips 30 are considerably reduced. Therefore, it is possible to easily perform the removing work for the lamp clips 30.

The plural lamp clips 30 are provided. In the plural lamp clips 30, moving directions of the locking portions 32 from the fixed position to the attaching and detaching position side are the same. Consequently, when the reflection sheet 27 is slid from the initial position, all the lamp clips 30 can be moved from the fixed position to the attaching and detaching position side all together. Therefore, it is possible to improve workability related to the removal of the lamp clips 30.

Second Embodiment

Figure 15:
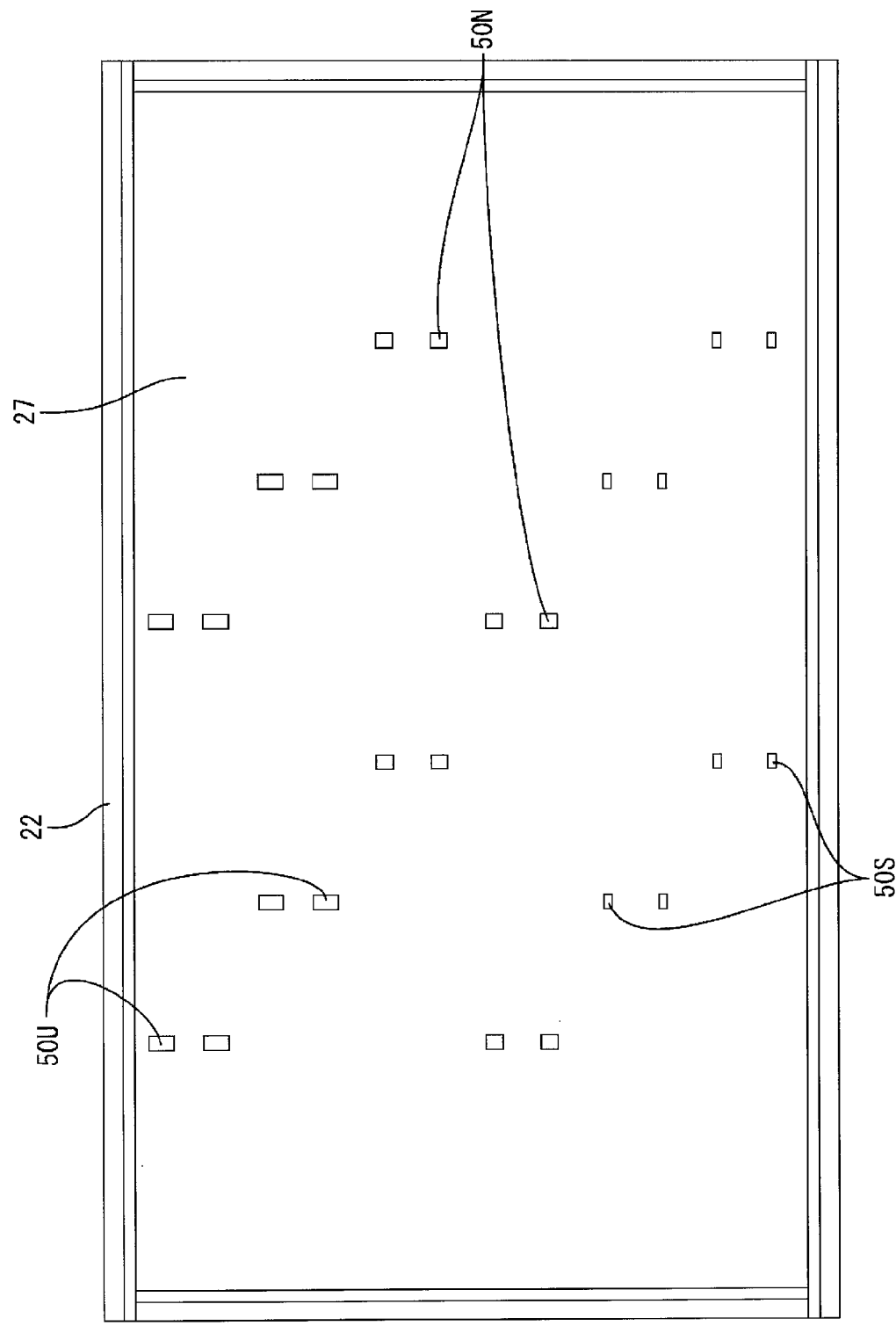
FIG. 15 is a plan view showing a state in which a reflection sheet is arranged in a chassis according to a second embodiment.
Figure 19:
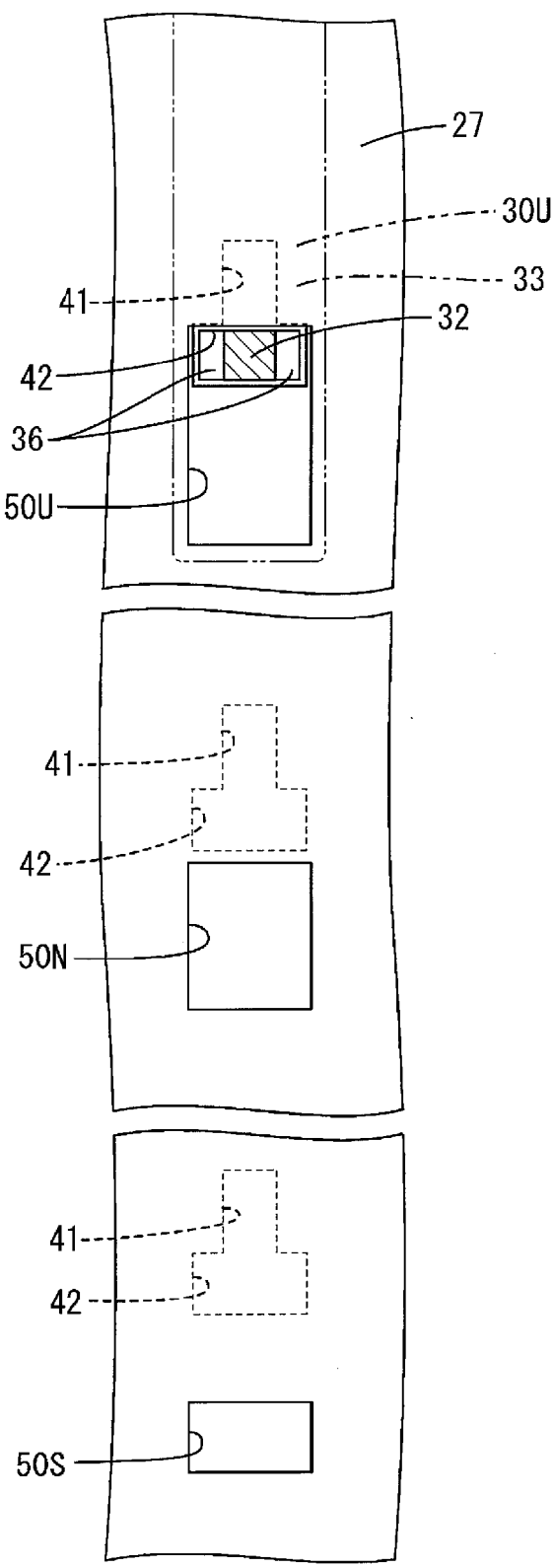
FIG. 19 is a partially enlarged plan sectional view showing a state in which an upper lamp clip is arranged in the attaching and detaching position.

A television receiver TV according to a second embodiment embodying the present invention is explained below with reference to FIGS. 15 and 19.

The television receiver TV according to this embodiment is different from the first embodiment in that the size of insertion holes 50 is set to be different among the lamp clips 30. Components same as those in the first embodiment are denoted by the same reference numerals and signs and redundant explanation of the components is omitted.

The television receiver TV according to this embodiment includes, as in the first embodiment, the liquid crystal panel 11 and the backlight unit 20. The backlight unit 20 includes, as in the first embodiment, the chassis 22 on which the discharge tubes 21 are arranged on the front side, the reflection sheet 27 arranged between the discharge tubes 21 and the chassis 22, and the lamp clips 30 that retain the discharge tubes 21.

The chassis 22 includes, as in the first embodiment, the locking holes 41 in which the locking portions 32 of the lamp clips 30 are locked. As in the first embodiment, all the locking holes 41 are formed in substantially the same shape and same size. The locking surfaces 36 of the locking portions 32 are locked from the rear side to both the edges opposed in the left-right direction of the hole edges of the locking holes 41. In the chassis 22, as in the first embodiment, the through-holes 42 having a hole area larger than that of the locking holes 41 are provided continuously from the locking holes 41. The locking portions 32 of the lamp clips 30 are allowed to move between the fixed position where the locking portions 32 are located in the locking holes 41 and the attaching and detaching position where the locking portions 32 are located in the through-holes 42.

As in the first embodiment, the reflection sheet 27 is allowed to slide from the initial position where the insertion holes 50 communicate with the locking holes 41 in the direction along the moving direction of the locking portions 32.

As in the first embodiment, two insertion holes 50 are provided in the attaching position of one lamp clip 30 at a space equal to a space between a pair of locking portions 32 of each of the lamp clips 30.

The width dimension of the insertion holes 50 in the direction along the slide direction of the reflection sheet 27 (the up-down direction) is set to be different among the lamp clips 30. Specifically, the size of the insertion holes 50 is set to be different in each of the insertion holes 50 formed in predetermined regions of the reflection sheet 27. In this embodiment, the insertion hole 50 arranged in a top region among three regions formed by dividing the reflection sheet 27 in the up-down direction (referred to as upper insertion hole 50U), the insertion hole 50 arranged in a middle region (referred to as middle insertion hole 50N), and the insertion hole 50 arranged in a bottom region (referred to as lower insertion hole 50S) have different sizes. The width dimension in the up-down direction of the lower insertion hole 50S is set to be the smallest and the width dimension in the up-down direction is set to be larger in the insertion holes 50 formed in regions on the upper side.

The lower insertion holes 50S have a hole area larger than that of the locking holes 41 and assume a rectangular shape slightly long in the left-right direction (the longitudinal direction of the chassis 22). Like the through-holes 42 formed in the chassis 22, the lower insertion hole 50S is set to size for allowing the locking portion 32 to pass in the front-back direction without deforming the locking portion 32 to be reduced in diameter, i.e., without deforming the locking leg 32B in the approaching direction. The width dimension in the up-down direction of the middle insertion hole 50N is set to a dimension about twice as large as the width dimension in the up-down direction of the lower insertion hole 50S. The width dimension in the up-down direction of the upper insertion hole 50U is set to a dimension about three times as large as the width dimension in the up-down direction of the lower insertion hole 50S. All the width dimensions in the left-right direction of the upper insertion hole 50U, the middle insertion hole 50N, and the lower insertion hole 50S are set the same.

Figure 16:
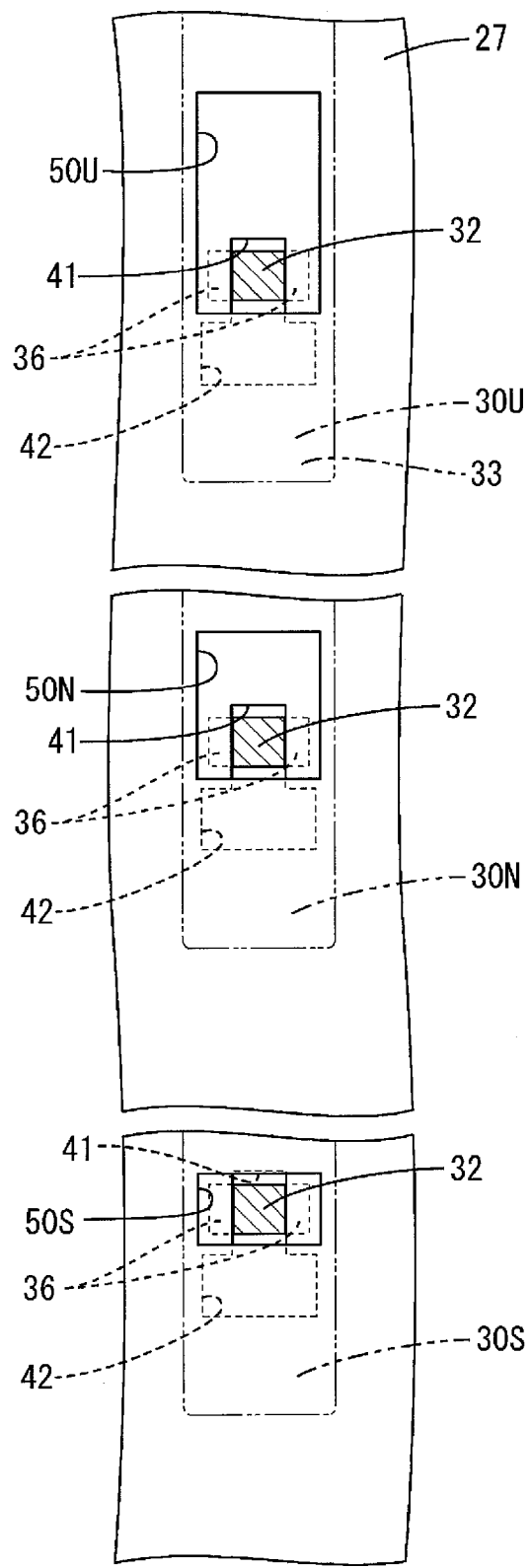
FIG. 16 is a partially enlarged plan sectional view showing a state in which all lamp clips are arranged in the fixed position and the reflection sheet is arranged in the initial position.

When the reflection sheet 27 is arranged in the initial position, as shown in FIG. 16, a pair of edges opposed in the up-down direction of the hole edge of the lower insertion hole 50S (a pair of edges opposed in the slide direction of the reflection sheet 27) are located along the outer edge of the base portion 32A of the locking portion 32 inserted through the lower insertion hole 50S. A lower edge of a pair of edges opposed in the up-down direction of the hole edge of the middle insertion hole 50N is located along the outer edge of the base portion 32A of the locking portion 32 inserted through the middle insertion hole 50N. An upper edge of the pair of edges are located apart upward from the outer edge of the base portion 32A of the locking portion 32. A space between the upper edge of the middle insertion hole 50N and the outer edge of the base portion 32A at this point is set equal to or slightly larger than the width dimension in the up-down direction of the base portion 32A. A lower edge of a pair of edges opposed in the up-down direction of the hole edge of the upper insertion hole 50U is located along the outer edge of the base portion 32A of the locking portion 32 inserted through the upper insertion hole 50U. An upper edge of the pair of edges is located apart upward from the outer edge of the base portion 32A of the locking portion 32. A space between the upper edge of the upper insertion hole 50U and the outer edge of the base portion 32A at this point is set to a dimension about twice as large as the width dimension in the up-down direction of the base portion 32A. In this way, edges on the rear side in the slide direction of the hole edges of the insertion holes 50 of the reflection sheet 27 arranged in the initial position and edges on the rear side in the moving direction to the attaching and detaching position side of the outer edges of the locking portions 32 of all the lamp clips 30 arranged in the fixed position is set to be different among the lamp clips 30.

Removing work for the lamp clips 30 is explained below. The lamp clips 30 attached to the top region of the reflection sheet 27 are referred to as upper lamp clips 30U, the lamp clips 30 attached to the middle region are referred to as middle lamp clips 30N, and the lamp clips 30 attached to the lower region are referred to as lower lamp clips 30S.

Figure 17:
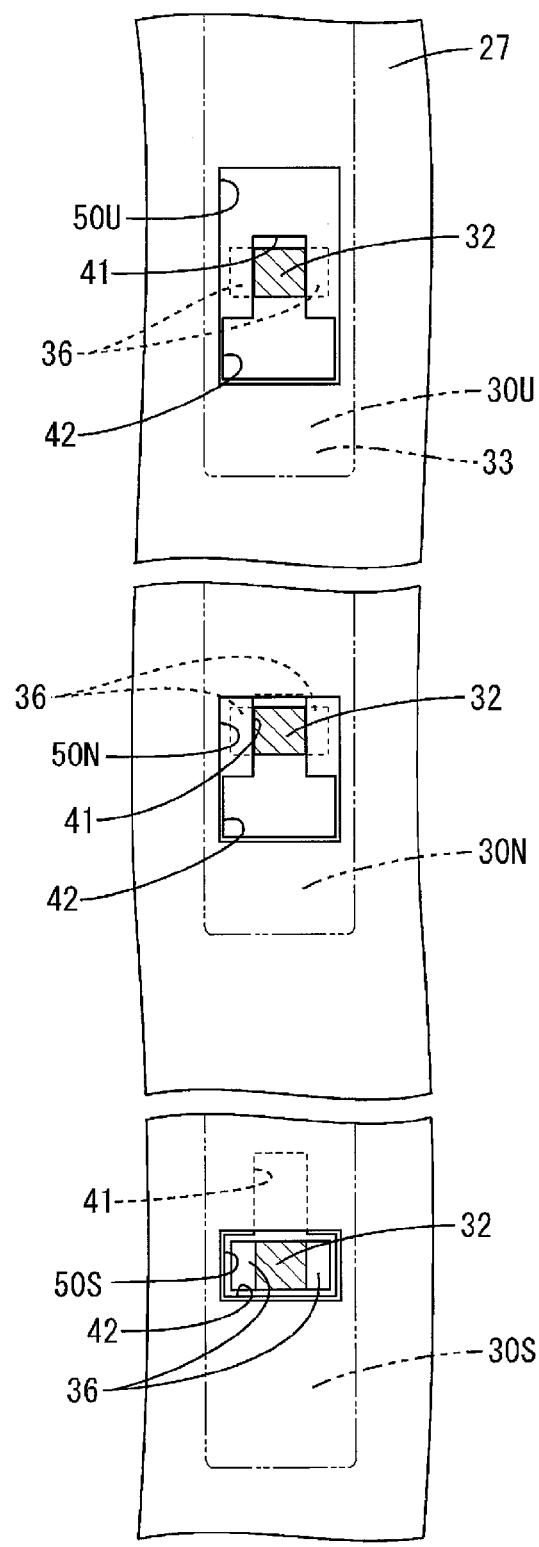
FIG. 17 is a partially enlarged plan sectional view showing a state in which the a lower lamp clip is arranged in the attaching and detaching position.

First, the reflection sheet 27 is slid from the initial position to the lower side. Then, immediately after the start of the slide of the reflection sheet 27, the upper edges of the lower insertion holes 50S come into contact with the upper edges of the base portions 32A of the locking portions 32 of the lower lamp clips 30S (edges on the rear side in the moving direction to the attaching and detaching position side of the outer edges) and press the base portions 32A to the lower side (the attaching and detaching position side) according to the further slide of the reflection sheet 27. The base portions 32A of the locking portions 32 of the lower lamp clips 30S pushed by the upper edges of the lower insertion holes 50S move from the locking holes 41 to the through-holes 42 side. Before long, the base portions 32A reach the attaching and detaching position (see FIG. 17). In this way, when all the lower lamp clips 30S can be removed from the chassis 22, all the lower lamp clips 30S are removed from the chassis 22. During this work, the locking portions 32 of the middle lamp clips 30N and the upper lamp clips 30U are not pressed by the middle insertion holes 50N and the upper insertion holes 50U. All the locking portions 32 are retained in a state in which the locking portions 32 are arranged in the fixed position. The upper edges of the hole edge of the middle insertion holes 50N are located along the outer edges of the base portions 32A of the locking portions 32 inserted through the middle insertion holes 50N. The lower edges of the middle insertion holes 50N are located apart downward from the outer edges of the base portions 32A of the locking portions 32. A space between the lower edges of the middle insertion holes 50N and the outer edges of the base portions 32A at this point is set to be equal to or slightly larger than the width dimension in the up-down direction of the base portions 32A.

Figure 18:
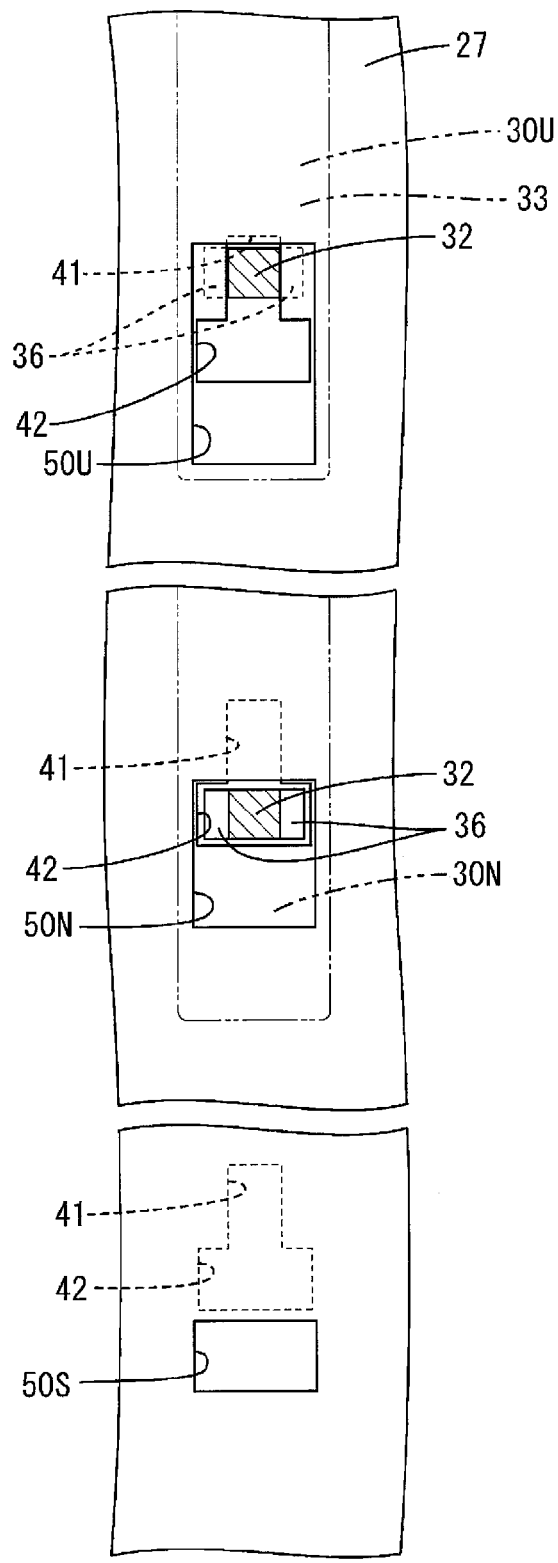
FIG. 18 is a partially enlarged plan sectional view showing a state in which a middle lamp clip is arranged in the attaching and detaching position.

Thereafter, the reflection sheet 27 is slid further to the lower side. Then, immediately after the start of the slide of the reflection sheet 27, the upper edges of the middle insertion holes 50N come into contact with the upper edges of the base portions 32A of the locking portions 32 of the middle lamp clips 30N (edges on the rear side in the moving direction to the attaching and detaching position side of the outer edges) and press the base portions 32A to the lower side (the attaching and detaching position side) according to the further slide of the reflection sheet 27. The base portions 32A of the locking portions 32 of the middle lamp clips 30N pushed by the upper edges of the middle insertion holes 50N move from the locking holes 41 to the through-holes 42 side. Before long, the base portions 32A reach the attaching and detaching position (see FIG. 18). In this way, when all the middle lamp clips 30N can be removed from the chassis 22, all the middle lamp clips 30N are removed from the chassis 22. At this stage, the locking portions 32 of the upper lamp clips 30U are not pressed by the upper insertion holes 50U. All the locking portions 32 are arranged in the fixed position. The upper edges of the hole edges of the upper insertion holes 50U are located along the outer edges of the base portions 32A of the locking portions 32 inserted through the upper insertion holes 50U. The lower edges of the hole edges are located apart downward from the outer edges of the base portions 32a of the locking portions 32.

Thereafter, the reflection sheet 27 is slid further to the lower side. Then, immediately after the start of the slide of the reflection sheet 27, the upper edges of the upper insertion holes 50U come into contact with the upper edges of the base portions 32A of the locking portions 32 of the upper lamp clips 30U (edges on the rear side in the moving direction to the attaching and detaching position side of the outer edges) and press the base portions 32A to the lower side (the attaching and detaching position side) according to the further slide of the reflection sheet 27. The base portions 32A of the locking portions 32 of the upper lamp clips 30U pushed by the upper edges of the upper insertion holes 50U move from the locking holes 41 to the through-holes 42 side. Before long, the base portions 32A reach the attaching and detaching position (see FIG. 19). In this way, when all the upper lamp clips 30U can be removed from the chassis 22, all the upper lamp clips 30U are removed from the chassis 22. Consequently, the removing work for all the lamp clips 30 attached to the chassis 22 is completed.

As explained above, in this embodiment, when the lamp clips 30 are removed, as in the first embodiment, the reflection sheet 27 is slid from the initial position and the lamp clips 30 are moved from the fixed position to the attaching and detaching position, whereby the locking portions 32 can be pulled out to the front side from the through-holes 42 and the insertion holes 50. Therefore, it is possible to easily remove the lamp clips 30.

A distance between the edges on the rear side in the slide direction of the hole edges of the insertion holes 50 of the reflection sheet 27 arranged in the initial position and the edges on the rear side in the moving direction to the attaching and detaching position side of the outer edges of the locking portions 32 arranged in the fixed position is set to be different among the lamp clips 30. Consequently, when the reflection sheet 27 is slid from the initial position, the hole edges of the insertion holes 50 come into contact with the outer edges of the locking portions 32 of the lamp clips 30 in order and press the locking portions 32 from the fixed position to the attaching and detaching position side. When the locking portions of all the lamp clips are pressed by the reflection sheet at a time, if the number of lamp clips attached to the chassis increases, large force is required to slide the reflection sheet. It is likely that it is difficult to perform smooth slide operation because, for example, the reflection sheet is damaged. However, in this embodiment, since the reflection sheet 27 presses the lamp clips 30 in order, even if the number of lamp clips 30 attached to the chassis 22 increases, it is possible to disperse force acting on the reflection sheet 27. Therefore, it is possible to easily perform the removing work for the lamp clips 30.

Third Embodiment

Figure 27:
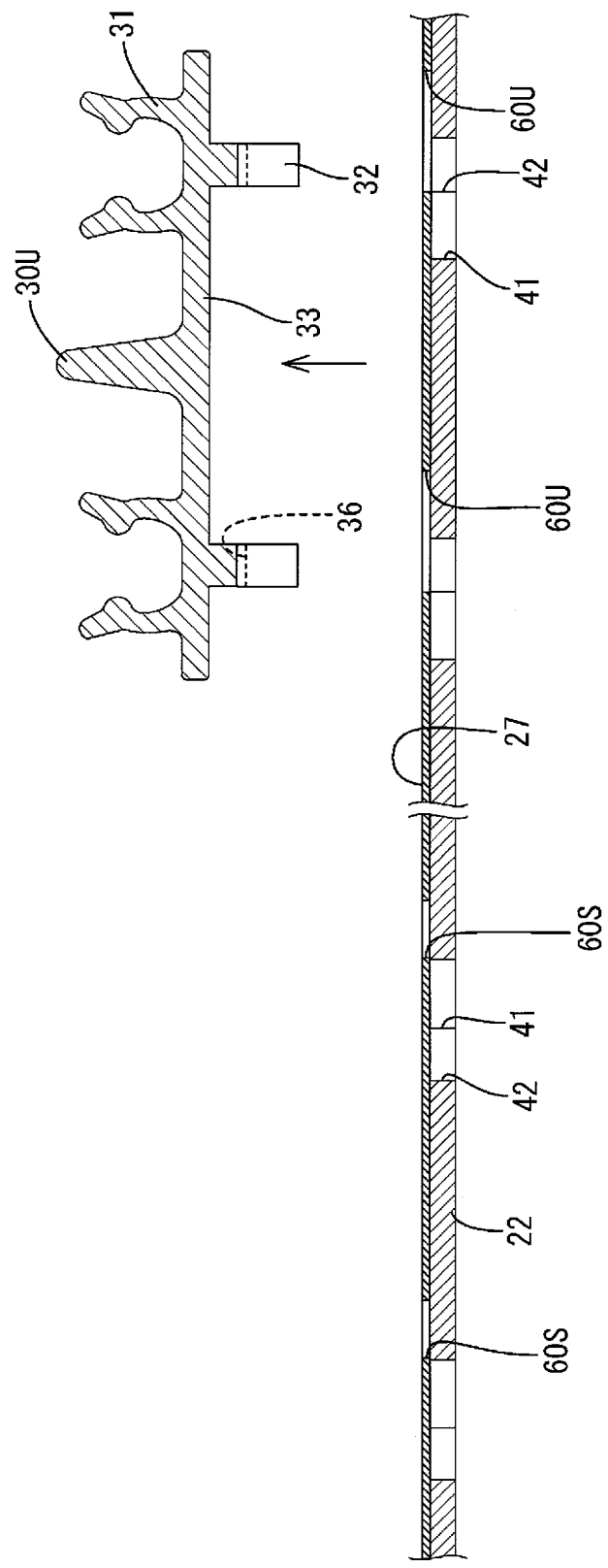
FIG. 27 is a partially enlarged sectional view showing a state in which the upper lamp clip is removed.

A television receiver TV according to a third embodiment embodying the present invention is explained below with reference to FIGS. 20 and 27.

The television receiver TV according to this embodiment is different from the first embodiment in that a moving direction from the fixed position to the attaching and detaching position side of the locking portions 32 is set to be different among the lamp clips 30. Components same as those in the first embodiment are denoted by the same reference numerals and signs and redundant explanation of the components is omitted.

The television receiver TV according to this embodiment includes, as in the first embodiment, the liquid crystal panel 11 and the backlight unit 20. The backlight unit 20 includes, as in the first embodiment, the chassis 22 on which the discharge tubes 21 are arranged on the front side, the reflection sheet 27 arranged between the discharge tubes 21 and the chassis 22, and the lamp clips 30 that retain the discharge tubes 21.

The chassis 22 includes, as in the first embodiment, the locking holes 41 in which the locking portions 32 of the lamp clips 30 are locked. As in the first embodiment, all the locking holes 41 are formed in substantially the same shape and same size. The locking surfaces 36 of the locking portions 32 are locked from the rear side to both the edges opposed in the left-right direction of the hole edges of the locking holes 41.

In the chassis 22, as in the first embodiment, the through-holes 42 having a hole area larger than that of the locking holes 41 are provided continuously from the locking holes 41. The locking portions 32 of the lamp clips 30 are allowed to move between the fixed position where the locking portions 32 are located in the locking holes 41 and the attaching and detaching position where the locking portions 32 are located in the through-holes 42.

As in the first embodiment, the through-holes 42 are provided continuously to the locking holes 41. All the through-holes 42 are formed in substantially the same shape and same size and set to size for allowing the locking portions 32 to pass in the front-back direction without deforming the locking portions 32 to be reduced in diameter.

Figure 20:
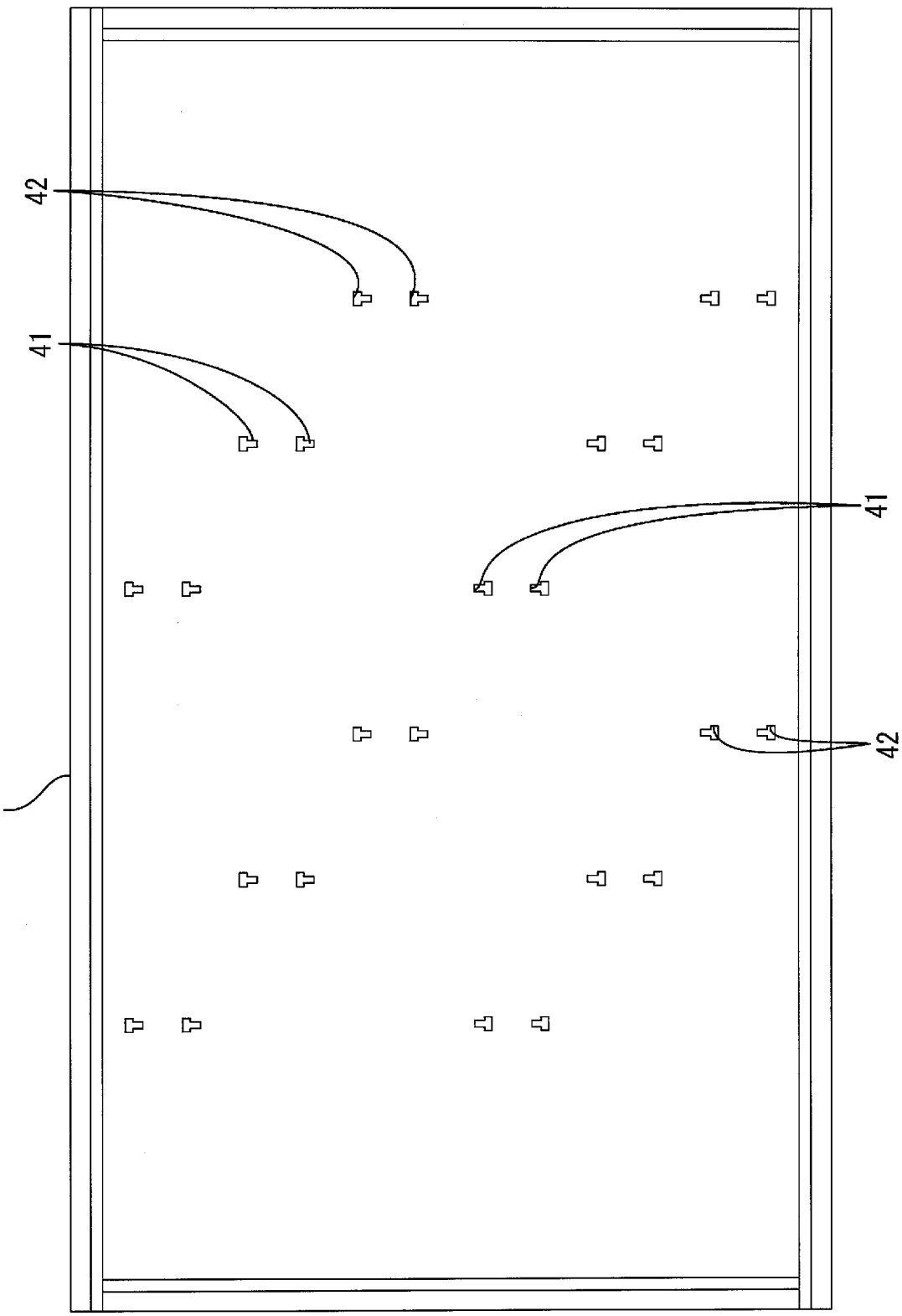
FIG. 20 is a plan view of a chassis according to a third embodiment.
Figure 21:
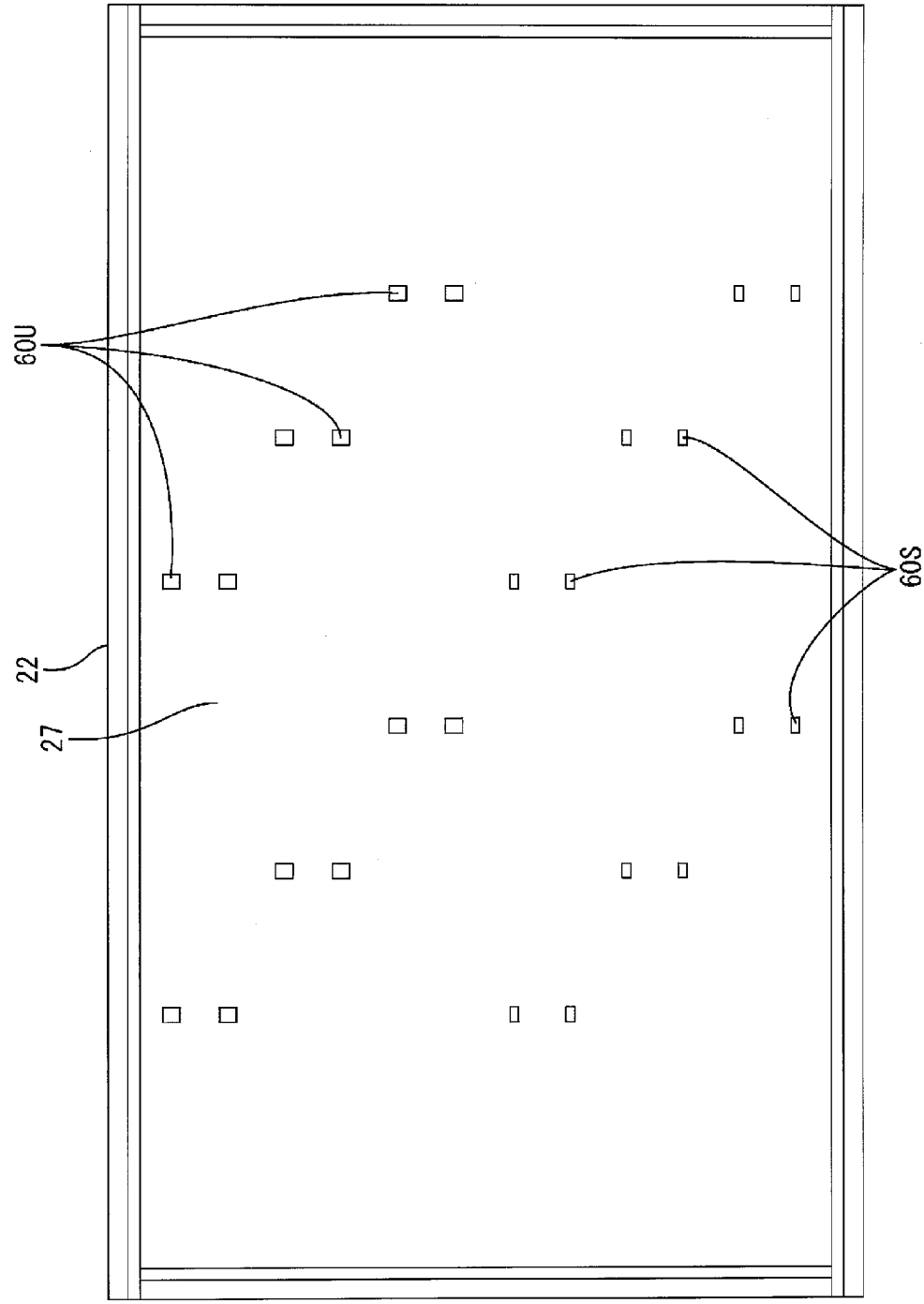
FIG. 21 is a plan view showing a state in which a reflection sheet is arranged in the chassis.

Forming positions of the through-holes 42 with respect to the locking holes 41 are set different for the through-holes 42 arranged in an upper region of the reflection sheet 27 and the through-holes 42 arranged in a lower region of the reflection sheet 27 (see FIG. 20). In other words, the through-holes 42 arranged in the upper region are formed above the locking holes 41. The through-holes 42 arranged in the lower region are formed below the locking holes 41. The locking holes 41 and the through-holes 42 arranged in the upper region and the locking holes 41 and the through-holes 42 arranged in the lower region are formed in shapes facing opposite directions in the up-down direction.

The locking portions 32 of the lamp clips 30 attached to the upper regions of the reflection sheet 27 (referred to as upper lamp clips 30U) move upward to reach from the fixed position to the attaching and detaching position. The locking portions 32 of the lamp clips 30 attached to the lower region (referred to as lower lamp clips 30S) move downward to reach from the fixed position to the attaching and detaching position.

As in the first embodiment, the reflection sheet 27 is allowed to slide from the initial position where insertion holes 60 communicate with the locking holes 41 in a direction along the moving direction of the locking portions 32.

As in the first embodiment, two insertion holes 60 are provided in the attaching position of one lamp clip 30 at a space equal to a space between a pair of locking portions 32 of the lamp clips 30.

The width dimension of the insertion holes 60 in a direction along the slide direction of the reflection sheet 27 (the up-down direction) is set to be different for each of the insertion holes 60 formed in a predetermined region of the reflection sheet 27. In this embodiment, the insertion holes 60 arranged in the upper region of the reflection sheet 27 (referred to as upper insertion holes 60U) and the insertion holes 60 arranged in the lower region (referred to as lower insertion holes 60S) have sizes different from each other.

As in the first embodiment, the lower insertion holes 60S have a hole area larger than that of the locking holes 41. The lower insertion holes 60S are formed in a rectangular shape slight long in the left-right direction (the longitudinal direction of the chassis 22) and set to size for allowing the locking portions 32 to pass in the front-back direction without deforming the locking portions 32 to be reduced in diameter. The width dimension in the up-down direction of the upper insertion holes 60U is set larger than the width dimension in the up-down direction of the lower insertion holes 60S and is specifically set to a dimension about twice as large as the width dimension in the up-down direction of the lower insertion holes 60S.

Figure 22:
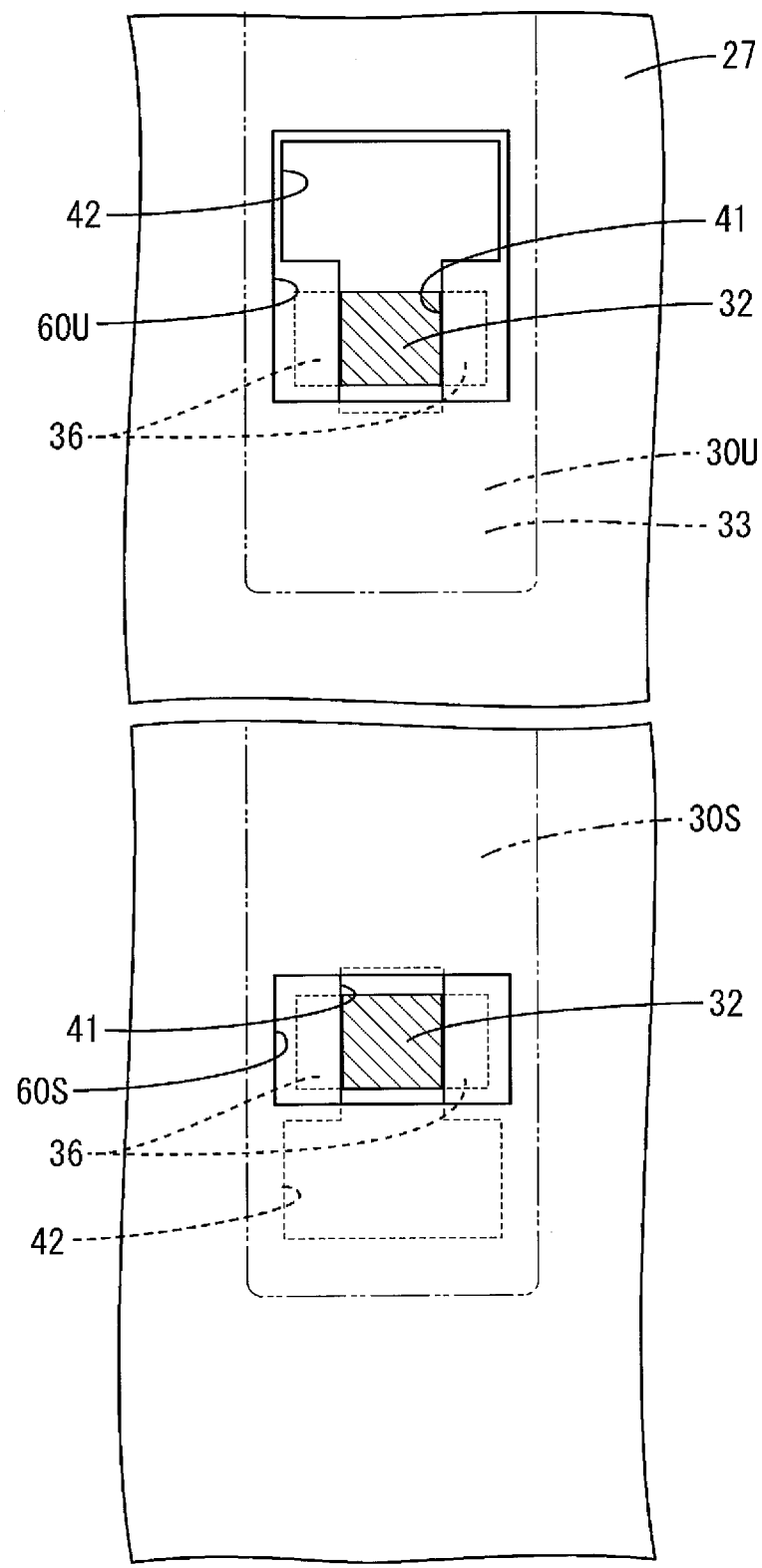
FIG. 22 is a partially enlarged plan sectional view showing a state in which all lamp clips are arranged in the fixed position and the reflection sheet is arranged in the initial position.

When the reflection sheet 27 is arranged in the initial position, as shown in FIG. 22, a pair of edges opposed in the up-down direction of the hole edge of the lower insertion hole 60S (a pair of edges opposed in the slide direction of the reflection sheet 27) are located along the outer edge of the base portion 32A of the locking portion 32 of the lower lamp clip 30S locked in the locking hole 41. A lower edge of a pair of edges opposed in the up-down direction of the hole edge of the upper insertion hole 60U is located along the outer edge of the base portion 32A of the locking portion 32 of the upper lamp clip 30U locked in the locking hole 41. An upper edge of the pair of edges is located apart upward from the outer edge of the base portion 32A of the locking portion 32. A space between the upper edge of the upper insertion hole 60U and the outer edge of the base portion 32A at this point is set equal to or slightly larger than the width dimension in the up-down direction of the base portion 32A.

Removing work for the lamp clips 30 is explained below.

Figure 23:
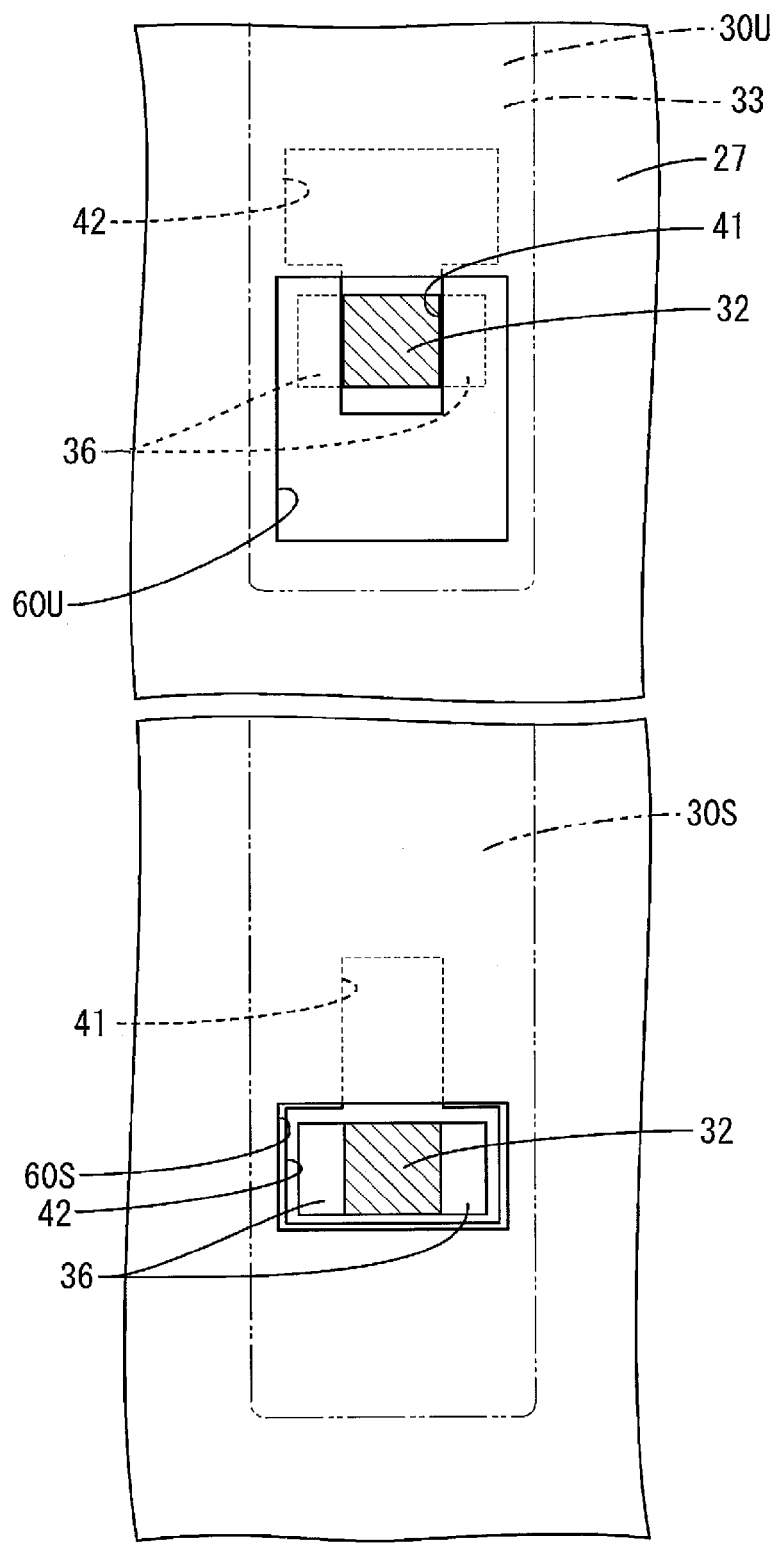
FIG. 23 is a partially enlarged plan sectional view showing a state in which a lower lamp clip is arranged in the attaching and detaching position.

First, the reflection sheet 27 is slid from the initial position to the lower side. Then, immediately after the start of the slide of the reflection sheet 27, the upper edges of the lower insertion holes 60S come into contact with the upper edges of the base portions 32A of the locking portions 32 of the lower lamp clips 30S (edges on the rear side in the moving direction to the attaching and detaching position side of the outer edges) and press the base portions 32A to the lower side (the attaching and detaching position side) according to the further slide of the reflection sheet 27. The base portions 32A of the locking portions 32 of the lower lamp clips 30S move from the locking holes 41 to the through-holes 42 side. Before long, the base portions 32A reach the attaching and detaching position (see FIG. 23). In this way, when all the lower lamp clips 30S can be removed from the chassis 22, all the lower lamp clips 30S are removed from the chassis 22. During this work, the upper insertion holes 60U move downward relatively to the locking portions 32 of the upper lamp clips 30U. Before long, the upper edges of the upper insertion holes 60U are arranged along the outer edges of the base portions 32A of the locking portions 32 of the upper lamp clips 30U. The lower edges of the upper insertion holes 60U are arranged in a position apart from the outer edges of the base portions 32A of the locking portions 32 of the upper lamp clips 30U. The locking portions 32 of the upper lamp clips 30U remains arranged in the fixed position without being pressed by the upper insertion holes 60U.

Figure 24:
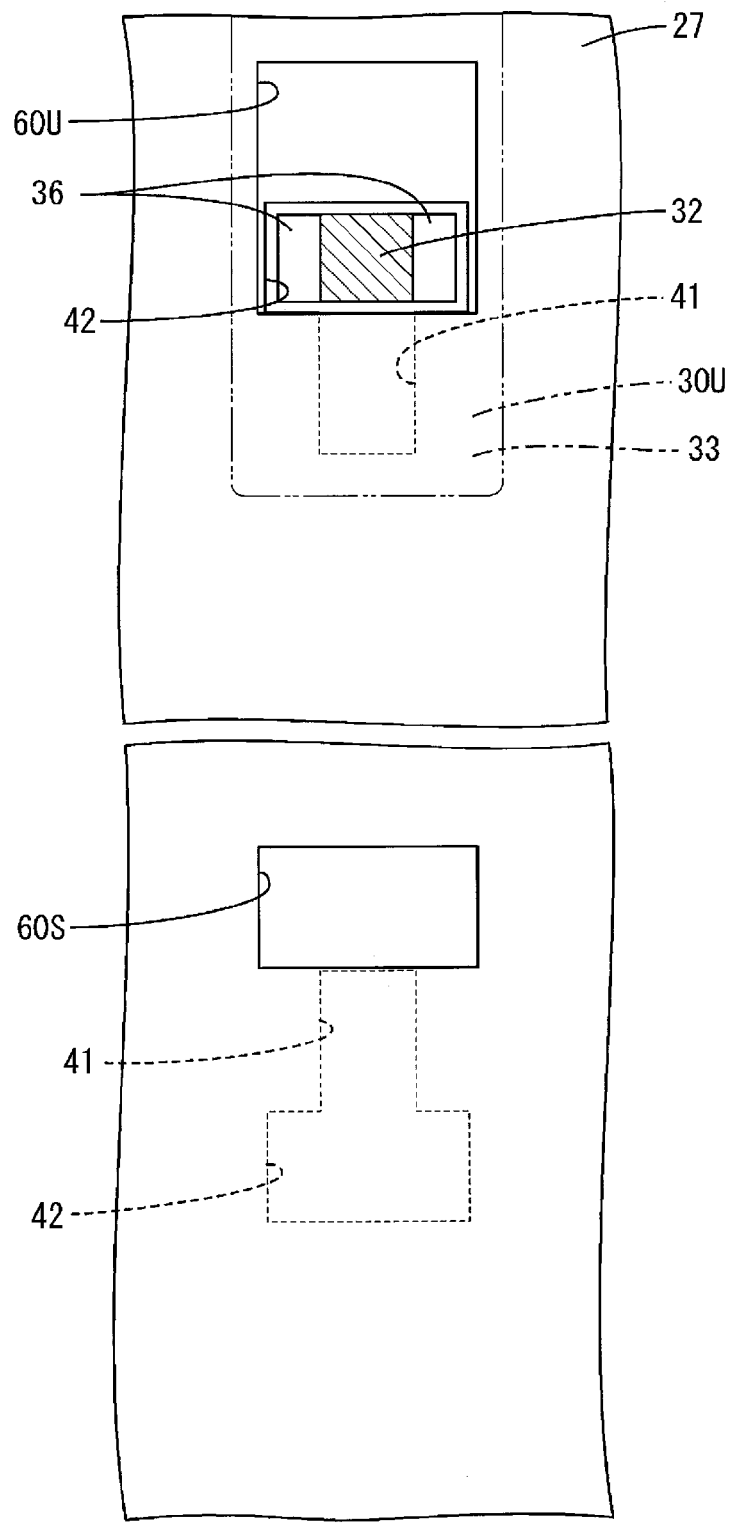
FIG. 24 is a partially enlarged plan sectional view showing a state in which an upper lamp clip is arranged in the attaching and detaching position.
Figure 25:
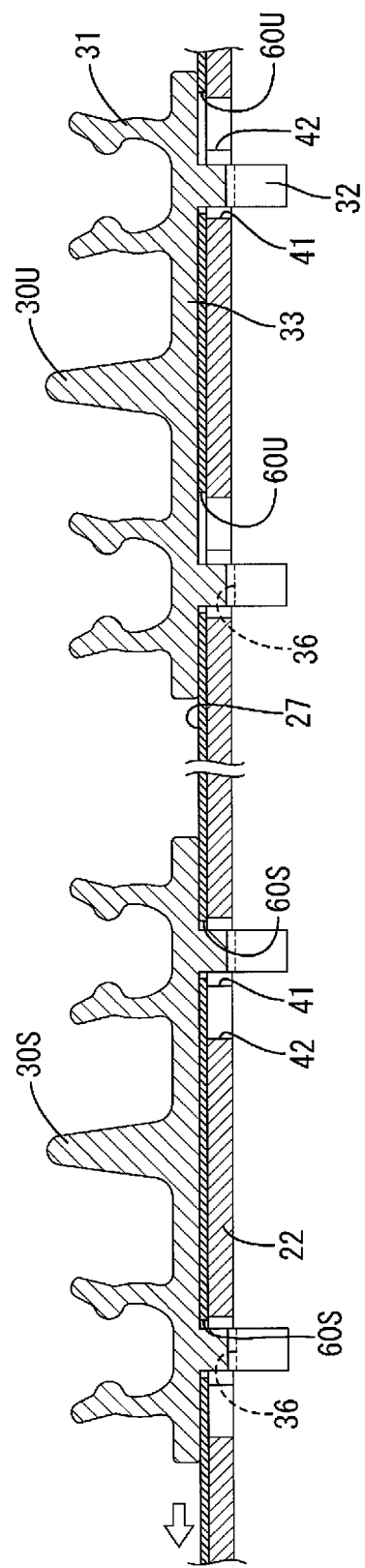
FIG. 25 is a partially enlarged sectional view showing a state in which all lamp clips are arranged in the fixed position and the reflection sheet is arranged in the initial position.
Figure 26:
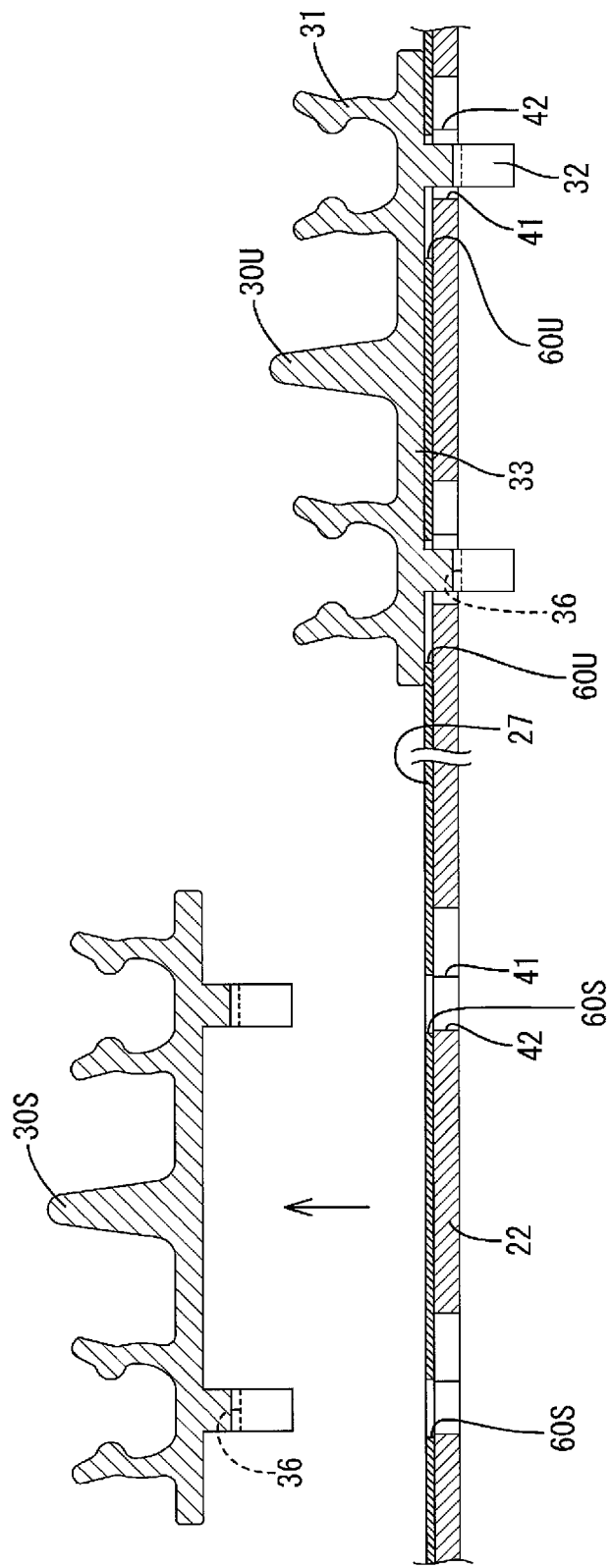
FIG. 26 is a partially enlarged sectional view showing a state in which the lower lamp clip is removed.

Thereafter, the reflection sheet 27 is slid to the upper side. Then, the upper insertion holes 60U move upward relatively to the locking portions 32 of the upper lamp clips 30U. Before long, the lower edges of the upper insertion holes 60U are arranged along the outer edges of the base portions 32A of the locking portions 32 of the upper lamp clips 30U. When the reflection sheet 27 is further slid upward, the lower edges of the upper insertion holes 60U come into contact with the lower edges of the base portions 32A of the locking portions 32 of the upper lamp clips 30U and press the base portions 32A to the upper side (the attaching and detaching position side). The base portions 32A of the locking portions 32 of the upper lamp clips 30U pressed by the lower edges of the upper insertion holes 60U move from the locking holes 41 to the through-holes 42 side. Before long, the base portions 32A reach the attaching and detaching position (see FIG. 24). In this way, when all the upper lamp clips 30U can be removed from the chassis 22, all the upper lamp clips 30U are removed from the chassis 22. Consequently, the removing work for all the lamp clips 30 attached to the chassis 22 is completed.

As explained above, in this embodiment, when the lamp clips 30 are removed, as in the first embodiment, the reflection sheet 27 is slid from the initial position and the locking portions 32 are moved from the fixed position to the attaching and detaching position, whereby the locking portions 32 can be pulled out to the front side from the through-holes 42 and the insertion holes 60. Therefore, it is possible to easily remove the lamp clips 30.

Further, the plural lamp clips 30 are provided. The moving direction from the fixed position to the attaching and detaching position side of the locking portions 32 is set to be different between the upper lamp clips 30U and the lower lamp clips 30S. Consequently, the reflection sheet 27 is slid in different directions. Specifically, the reflection sheet 27 is slid downward and then slid upward. The locking portions 32 of the lower lamp clips 30S and the locking portions 32 of the upper lamp clips 30U are moved from the fixed position to the attaching and detaching position in order. Therefore, even if the number of lamp clips 30 attached to the chassis 22 increases, since force acting on the reflection sheet 27 can be dispersed, it is possible to easily perform the removing work for the lamp clips 30.

Fourth Embodiment

Figure 28:
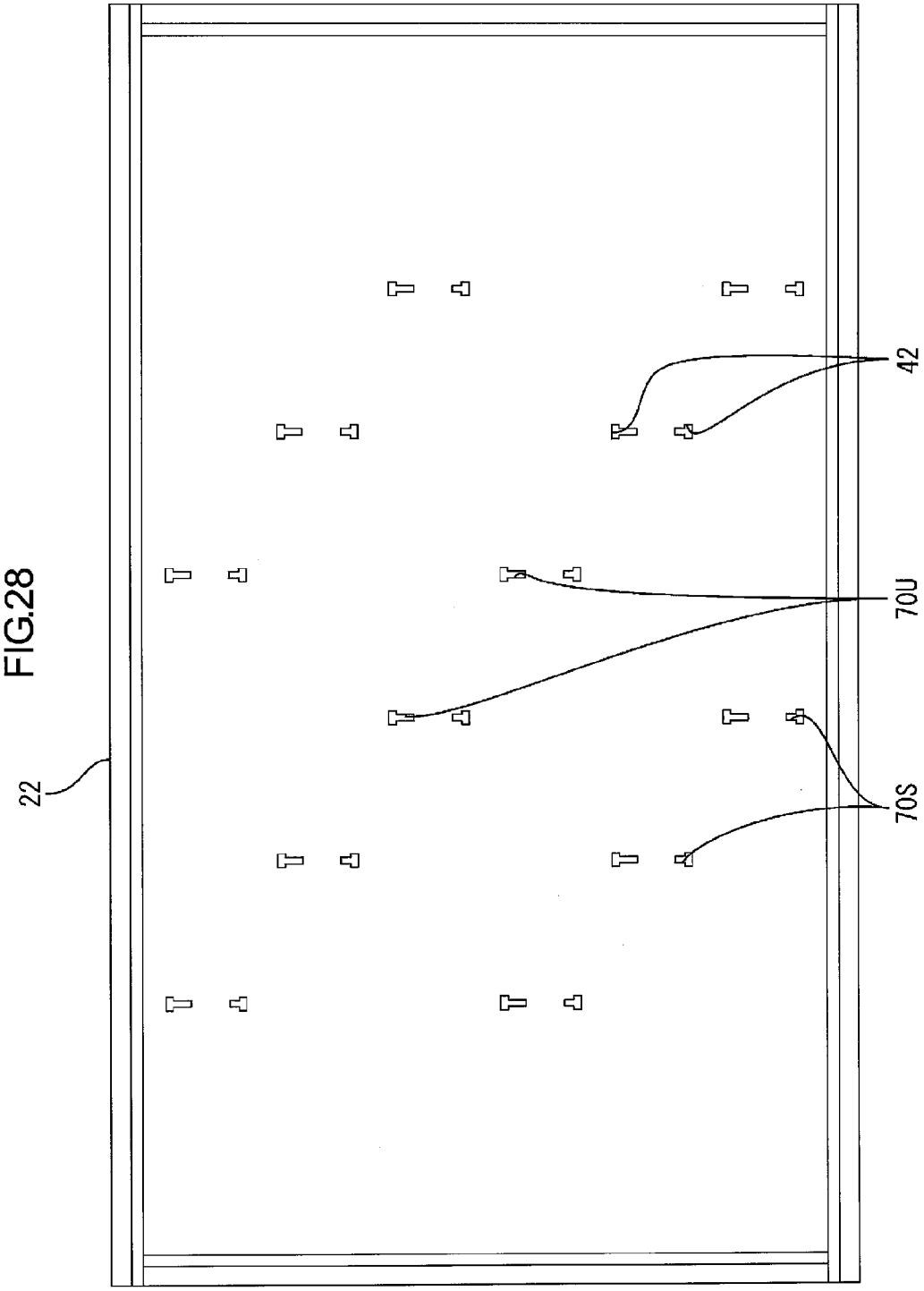
FIG. 28 is a plan view of a chassis according to a fourth embodiment.
Figure 34:
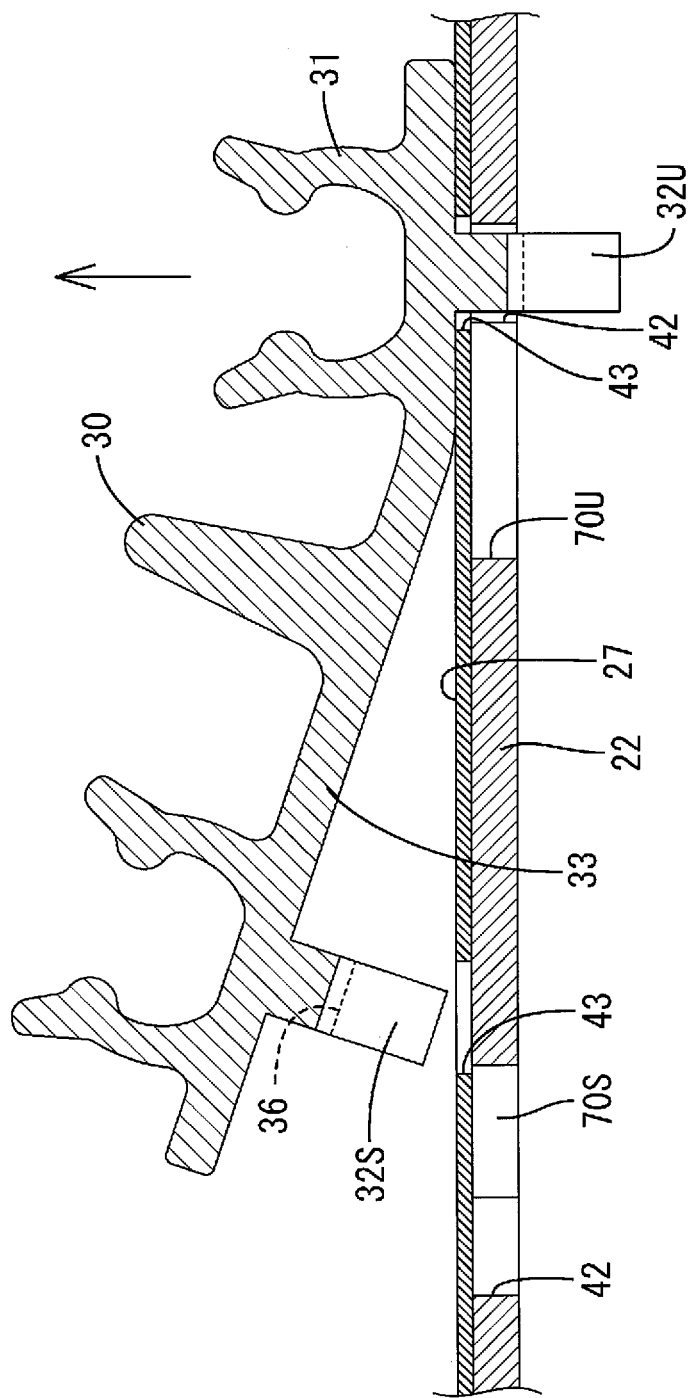
FIG. 34 is a partially enlarged plan sectional view showing a state in which the upper locking portion is removed.
Figure 35:
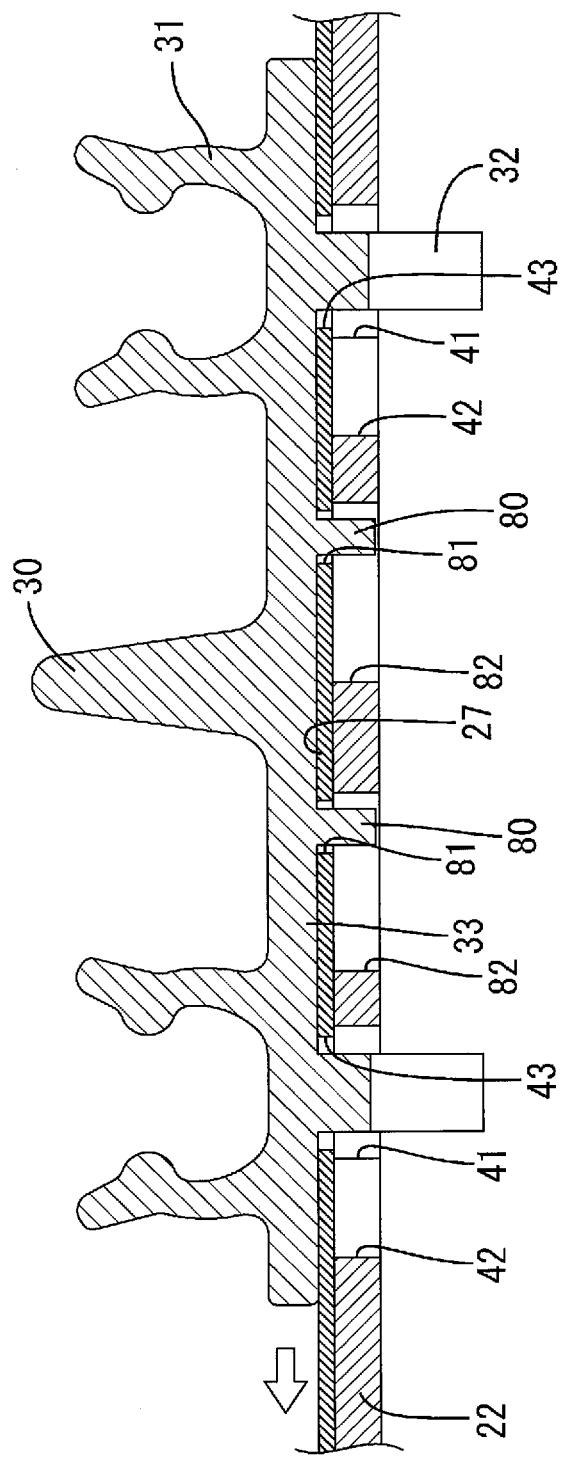
FIG. 35 is a partially enlarged sectional view showing a state in which locking portions of a lamp clip according to a fifth embodiment are arranged in the fixed position and a reflection sheet is arranged in the initial position.
Figure 36:
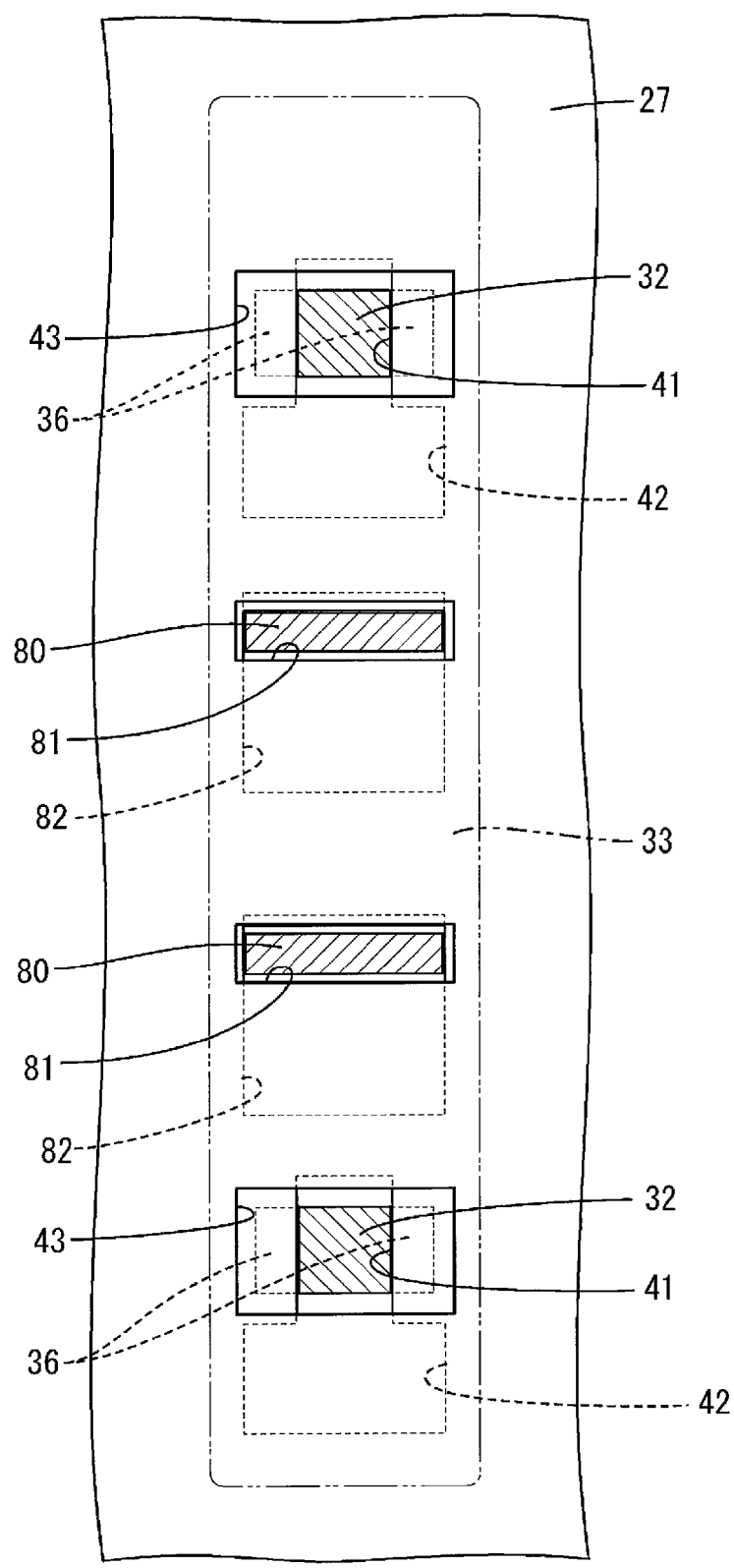
FIG. 36 is a partially enlarged plan sectional view showing the state.
Figure 37:
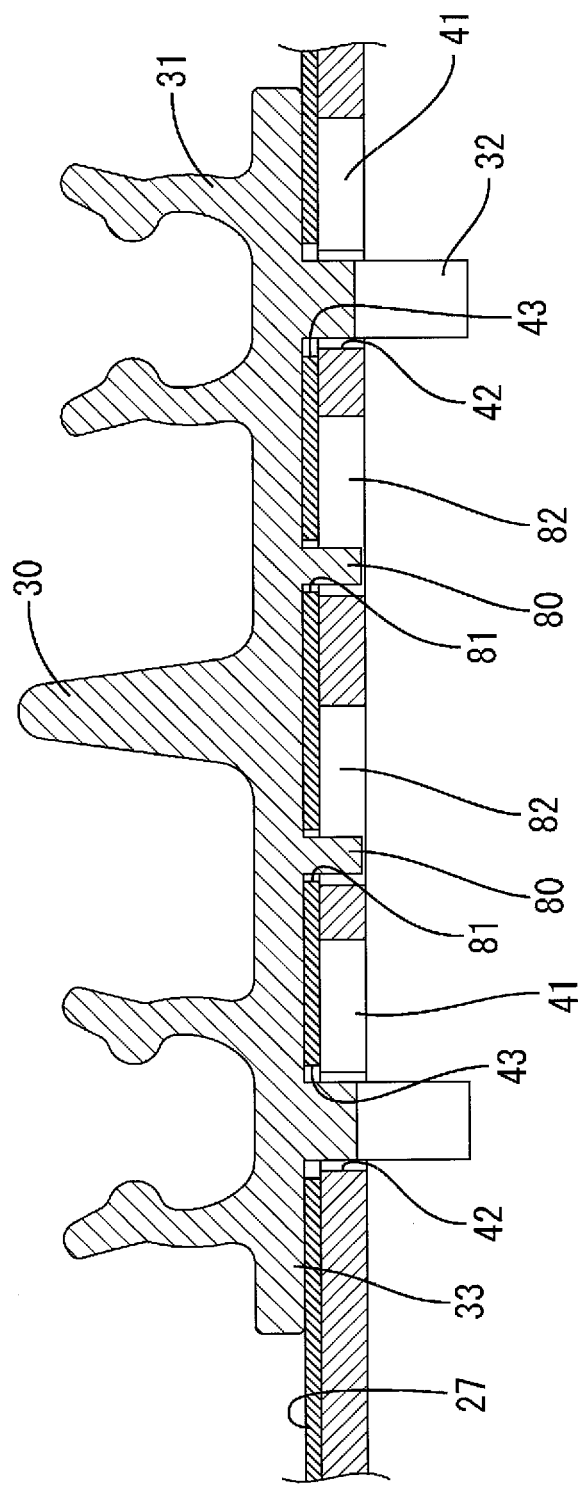
FIG. 37 is a partially enlarged sectional view showing a state in which the locking portions of the lamp clip are arranged in the attaching and detaching position.
Figure 38:
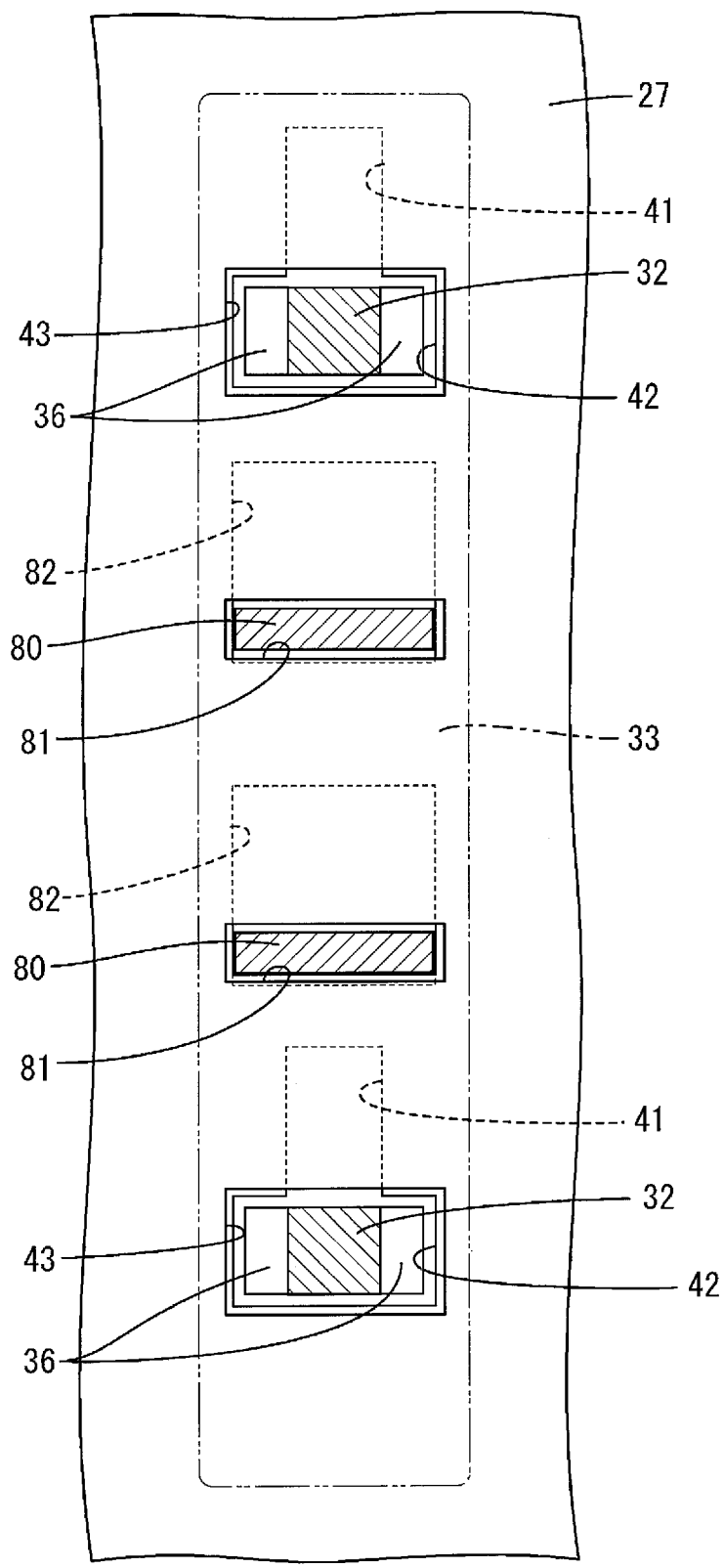
FIG. 38 is a partially enlarged plan sectional view showing the state.

A television receiver TV according to a fourth embodiment embodying the present invention is explained below with reference to FIGS. 28 and 34.

The television receiver TV according to this embodiment is different from the first embodiment in that a moving direction from the fixed position to the attaching and detaching position side of the locking portions 32 provided in the lamp clips 30 is set to be different among the locking portions 32. Components same as those in the first embodiment are denoted by the same reference numerals and signs and redundant explanation of the components is omitted.

The television receiver TV according to this embodiment includes, as in the first embodiment, the liquid crystal panel 11 and the backlight unit 20. The backlight unit 20 includes, as in the first embodiment, the chassis 22 on which the discharge tubes 21 are arranged on the front side, the reflection sheet 27 arranged between the discharge tubes 21 and the chassis 22, and the lamp clips 30 that retain the discharge tubes 21.

The chassis 22 includes, as in the first embodiment, locking holes 70 in which the locking portions 32 of the lamp clips 30 are locked. As in the first embodiment, two locking holes 70 are provided in the attaching position of each of the lamp clips 30 of the bottom wall 22A of the chassis 22. A pair of locking holes 70 provided in the attaching position of each of the lamp clips 30 have different sizes. Specifically, the width dimension in the up-down direction of the locking hole 70 on the upper side (referred to as upper locking hole 70U) of the pair of locking holes 70 provided in the attaching position of each of the lamp clips 30 is set to be larger than the width dimension in the up-down direction of the locking hole 70 on the lower side (referred to as lower locking hole 70S) of the pair of locking holes 70 provided in the attaching position of each of the lamp clips 30. The upper locking hole 70U has an up-down direction dimension about twice as large as the lower locking hole 70S. The width dimensions in the left-right direction of the upper locking hole 70U and the lower locking hole 70S are set equal. The locking surfaces 36 of the locking portions 32 are locked from the rear side to both edges opposed in the left-right direction of the hole edges of the locking holes 70.

In the chassis 22, as in the first embodiment, the through-holes 42 having a hole area larger than that of the locking holes 70 are provided continuously from the locking holes 70. The locking portions 32 of the lamp clips 30 are allowed to move between the fixed position where the locking portions 32 are located in the locking holes 70 and the attaching and detaching position where the locking portions 32 are located in the through-holes 42.

As in the first embodiment, all the through-holes 42 are formed in substantially the same shape and same size and set to size for allowing the locking portions 32 to pass in the front-back direction without deforming the locking portions 32 to be reduced in diameter. A pair of through-holes 42 provided in the attaching position of each of the lamp clips 30 are different in forming positions with respect to the locking holes 70. In other words, the through-hole 42 on the upper side of the pair of through-holes 42 is formed above the upper locking hole 70U and the through-hole 42 on the lower side is formed below the lower locking hole 70S. Consequently, the moving direction from the fixed position to the attaching and detaching position side of the locking portions 32 is set to be different (in opposite directions) between a pair of locking portions 32 provided in each of the lamp clips 30. In other words, the locking portion 32 locked in the upper locking hole 70U in each of the lamp clips 30 (referred to as upper locking portion 32U) moves upward to reach from the fixed position to the attaching and detaching position. The locking portion 32 locked in the lower locking holes 70S (the lower locking portion 32S) moves downward to reach from the fixed position to the attaching and detaching position.

Figure 29:
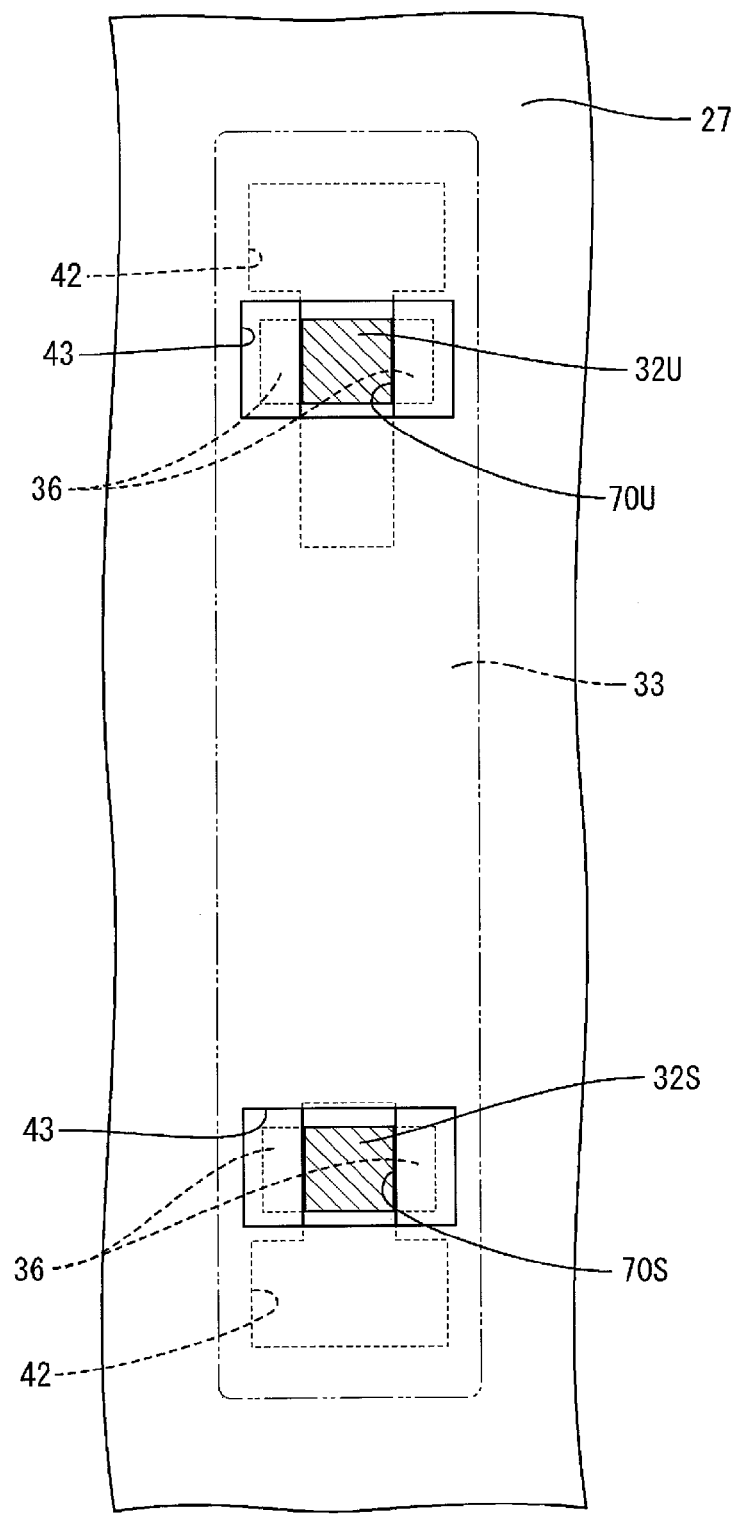
FIG. 29 is a partially enlarged plan sectional view showing a state in which an upper locking portion and a lower locking portion are arranged in the fixed position and the reflection sheet is arranged in the initial position.
Figure 30:
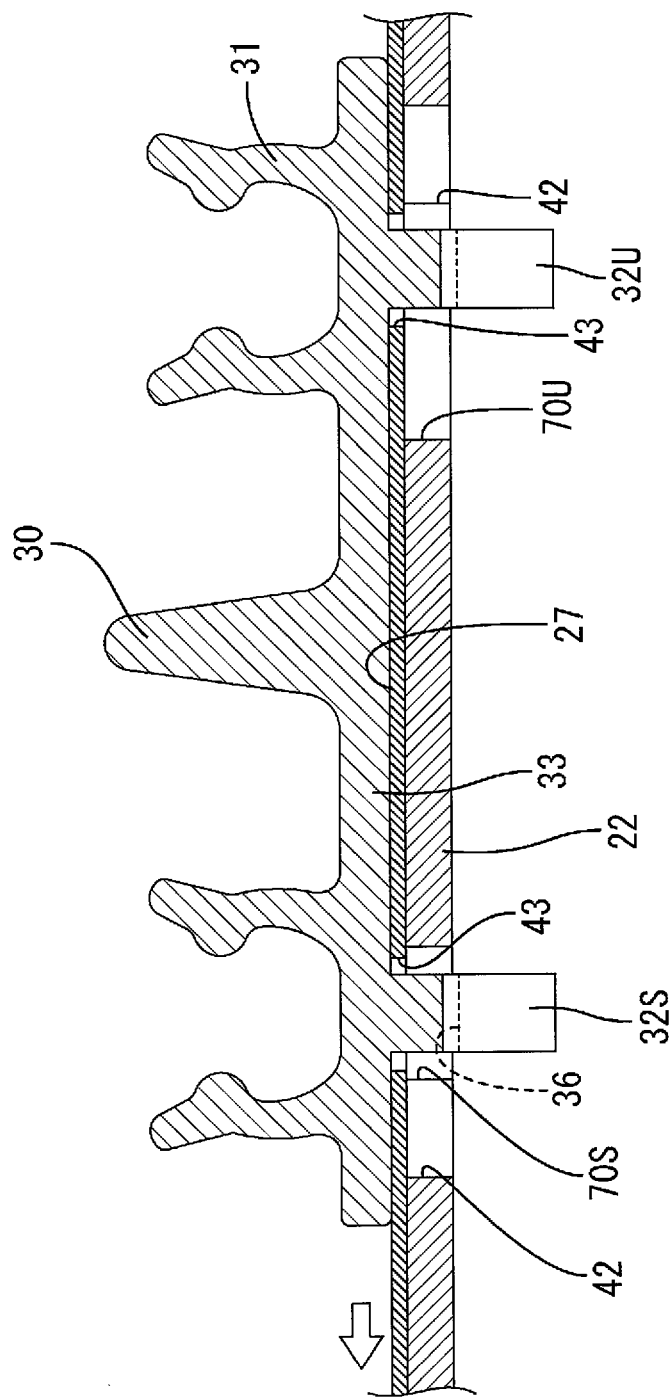
FIG. 30 is a partially enlarged sectional view showing the state.

As shown in FIG. 29, the base portion 32A of the lower locking portion 32S of each of the lamp clips 30 is arranged in a substantially center position of the lower locking hole 70S when the base portion 32A is in the fixed position. The base portion 32A of the upper locking portion 32U is arranged in a position closer to the upper side of the upper locking hole 70U (a position further on the upper side than the center position in the up-down direction of the upper locking hole 70U) when the base portion 32A is in the fixed position. Under the base portion 32A of the upper locking portion 32U of the upper locking hole 70U, a dimension equivalent to the width dimension in the up-down direction of the base portion 32A is opened.

In the reflection sheet 27, as in the first embodiment, two insertion holes 43 through which the locking portions 32 are inserted in the front-rear direction are provided for one lamp clip 30. As in the first embodiment, all the insertion holes 43 are formed in substantially the same shape and size and are set to size for allowing the locking portions 32 to pass in the front-back direction without deforming the locking portions 32 to be reduced in diameter. A pair of edges extending in the longitudinal direction of the hole edges of the insertion holes 43 (a pair of edges opposed in the slide direction of the reflection sheet 27) are located along the outer edges of the base portions 32A of the locking portions 32 inserted through the insertion holes 43.

Removing Work for the Lamp Clips 30 is Explained Below.

Figure 31:
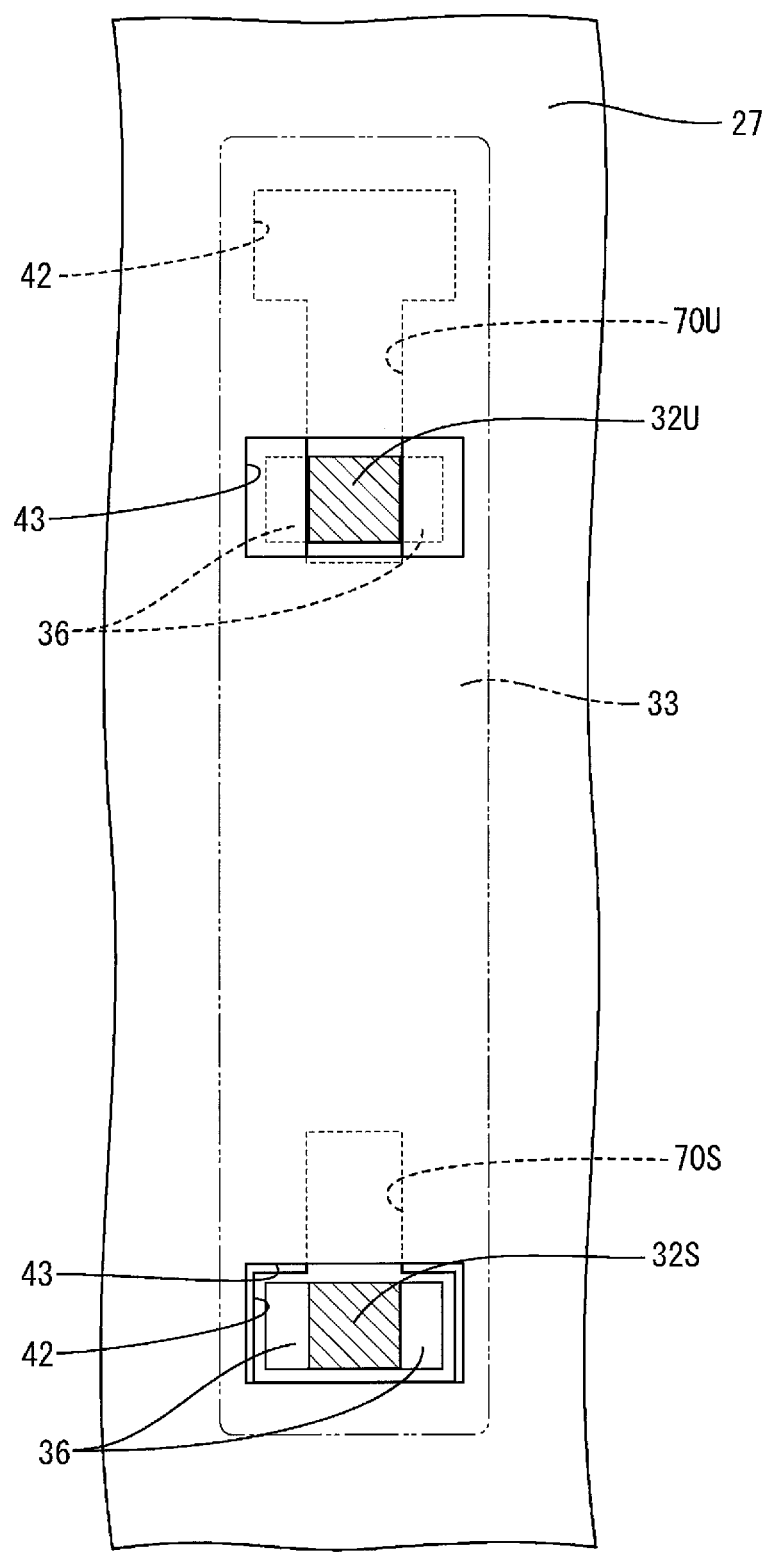
FIG. 31 is a partially enlarged plan sectional view showing a state in which the lower locking portion is arranged in the attaching and detaching position.
Figure 32:
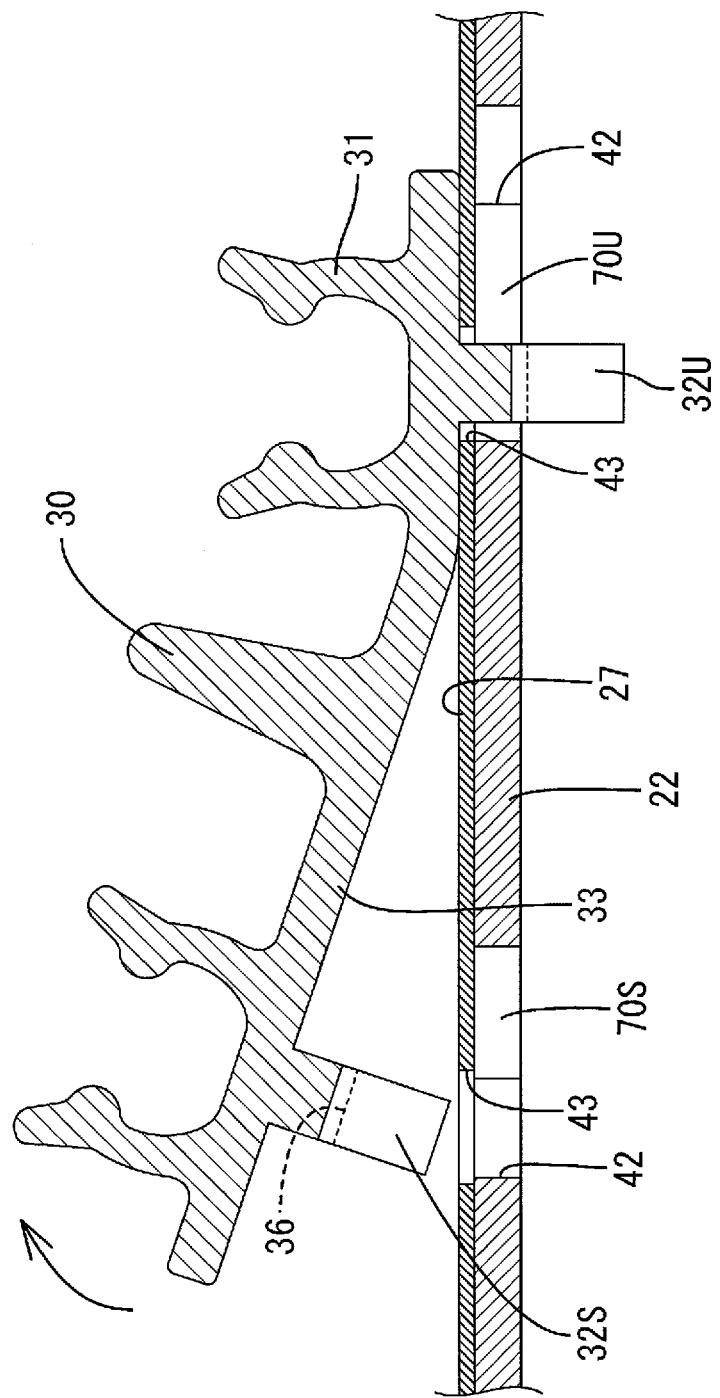
FIG. 32 is a partially enlarged plan sectional view showing a state in which the lower locking portion is removed.

First, the reflection sheet 27 is slid from the initial position to the lower side. Then, immediately after the start of the slide of the reflection sheet 27, the upper edges of the insertion holes 43 respectively come into contact with the upper edges of the base portions 32A of the upper locking portions 32U and the lower locking portions 32S of the lamp clips 30 and press the base portions 32A to the lower side (the attaching and detaching position side) according to the further slide of the reflection sheet 27. Then, the base portions 32A of the lower locking portions 32S of the lamp clips 30S pushed by the upper edge of the insertion holes 43 move from the lower locking holes 70S to the through-holes 42 side. Before long, the base portions 32A reach the attaching and detaching position (see FIG. 31). In this way, when the lower locking portions 32S of all the lamp clips 30 can be removed from the chassis 22, as shown in FIG. 32, the lower locking portions 32S are pulled out to the front side from the chassis 22. During this work, the base portions 32A of the upper locking portions 32U of the lamp clips 30 are pushed by the upper edges of the insertion holes 43, move downward relatively to the upper locking holes 70U, and reach lower end positions thereof. At this stage, the upper locking portions 32U of the lamp clips 30 remain locked to the upper locking holes 70U.

Figure 33:
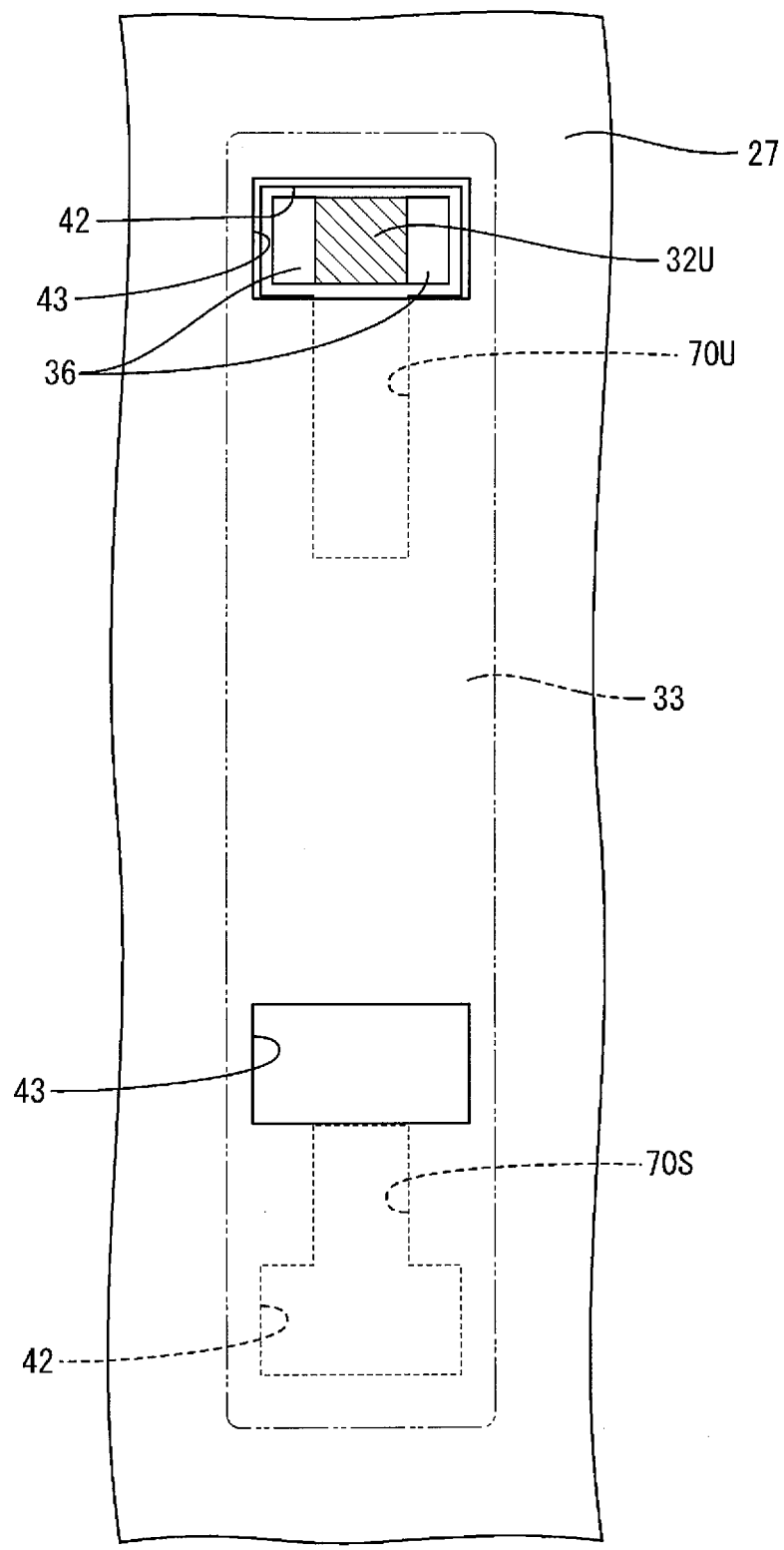
FIG. 33 is a partially enlarged plan sectional view showing a state in which the upper locking portion is arranged in the attaching and detaching position.

Thereafter, the reflection sheet 27 is slid to the upper side. Then, immediately after the start of the slide of the reflection sheet 27, the lower edges of the insertion holes 43 come into contact with the lower edges of the base portions 32A of the upper locking portions 32U of the lamp clips 30 (edges on the rear side in the moving direction to the attaching and detaching position side of the outer edges), and press the base portions 32A to the upper side (the attaching and detaching position side) according to the further slide of the reflection sheet 27. The base portions 32A of the upper locking portions 32U of the lamp clips 30 pushed by the lower edges of the insertion holes 43 pass upward through the upper locking holes 70U and move to the through-holes 42 side. Before long, the base portions 32A reach the attaching and detaching position (see FIGS. 33 and 34). In this way, when the upper locking portions 32 of all the lamp clips 30 can be removed from the chassis 22, all the upper locking portions 32U are pulled out from the chassis 22. Consequently, the removing work for all the lamp clips 30 attached to the chassis 22 is completed.

As explained above, in this embodiment, when the lamp clips 30 are removed, as in the first embodiment, the reflection sheet 27 is slid from the initial position and the locking portions 32 are moved from the fixed position to the attaching and detaching position, whereby the locking portions 32 can be pulled out to the front side from the through-holes 42 and the insertion holes 43. Therefore, it is possible to easily remove the lamp clips 30.

Further, the upper locking portions 32U and the lower locking portions 32S are provided in the lamp clips 30. The moving direction from the fixed position to the attaching and detaching position side is set to be different between the upper locking portions 32U and the lower locking portions 32S. Therefore, to move all the locking portions 32 (the upper locking portions 32U and the lower locking portions 32S) provided in the lamp clips 30 from the fixed position to the attaching and detaching position side, the reflection sheet 27 has to be slid in different directions, specifically, slid downward and then slid upward. When the moving direction from the fixed position to the attaching and detaching position side is the same in the upper locking portions and the lower locking portions, the reflection sheet slides in one direction, whereby all the locking portions are pushed by the reflection sheet and move to the attaching and detaching position side. It is likely that the lamp clips 30 are carelessly removed. However, since the moving direction from the fixed position to the attaching and detaching position side is set to be different between the upper locking portions 32U and the lower locking portions 32S. Therefore, it is possible to prevent the lamp clips 30 from being carelessly removed in that way.

Fifth Embodiment

A television receiver TV according to a fifth embodiment embodying the present invention is explained below with reference to FIGS. 35 to 38.

The television receiver TV according to this embodiment is different from the first embodiment in that auxiliary protrusions 80 protruding to the reflection sheet 27 side are provided in the lamp clip 30 and auxiliary holes 81 engaging with the auxiliary protrusions 80 are provided in the reflection sheet 27. Components same as those in the first embodiment are denoted by the same reference numerals and signs and redundant explanation of the components is omitted.

The television receiver TV according to this embodiment includes, as in the first embodiment, the liquid crystal panel 11 and the backlight unit 20. The backlight unit 20 includes, as in the first embodiment, the chassis 22 on which the discharge tubes 21 are arranged on the front side, the reflection sheet 27 arranged between the discharge tubes 21 and the chassis 22, and the lamp clips 30 that retain the discharge tubes 21.

The chassis 22 includes, as in the first embodiment, the locking holes 41 in which the locking portions 32 of the lamp clips 30 are locked. The through-holes 42 having a hole area larger than that of the locking holes 41 are provided continuously from the locking holes 41. As in the first embodiment, the insertion holes 43 for inserting the locking portions 32 in the front-back direction are formed to pierce through the reflection sheet 27.

The lamp clip 30 includes, as in the first embodiment, the lamp gripping portions 31 that grip the discharge tubes 21, the locking portions 32 locked to the rear surface of the chassis 22, and the base part 33 that holds the chassis 22 and the reflection sheet 27 between the base part 33 and the locking portions 32.

In the lamp clip 30, the auxiliary protrusions 80 protruding to the rear side (the reflection sheet 27 side) are provided. A pair of auxiliary protrusions 80 are provided on the rear surface of the base part 33 and located between a pair of locking portions 32. The pair of auxiliary protrusions 80 are formed in substantially the same shape and same size each other. The auxiliary protrusions 80 assume a wall shape of a substantially rectangular shape in section (a rectangle long in the lateral direction of the base part 33). A projection dimension (a front-back direction dimension) of the auxiliary protrusions 80 is set to a dimension larger than the thickness dimension of the reflection sheet 27. The auxiliary protrusions 80 are projected to the chassis 22 side. The pair of auxiliary protrusions 80 are opposed to each other and protrude. Opposed surfaces of the auxiliary protrusions 80 are substantially parallel.

In the reflection sheet 27, the auxiliary holes 81 engaging with the auxiliary protrusions 80 are provided. A pair of auxiliary holes 81 are formed between the insertion holes 43 of the reflection sheet 27 in positions corresponding to the auxiliary protrusions 80 in a state in which the locking portions 32 are inserted through the insertion holes 43. The pair of auxiliary holes 81 are formed in substantially the same shape and same size, assume a rectangular shape larger than the auxiliary protrusions 80, and pierce through the reflection sheet 27 in the front-rear direction. A pair of edges opposed in the slide direction of the reflection sheet 27 of the hole edge of the auxiliary hole 81 are located along the outer edge of the auxiliary protrusions 80 engaging in the auxiliary holes 81.

In the chassis 22, housing recessed portions 82 in which protruding ends of the auxiliary protrusions 80 are housed are provided. The housing recessed portions 82 are formed as holes piercing through the chassis 22 in the front-back direction. The housing recessed portions 82 are provided between the through-holes 42 on the upper side and the locking holes 41 on the lower side of the chassis 22. A pair of housing recessed portions 82 assume a rectangular shape of substantially the same shape and same size each other. The width dimension in the up-down direction of the housing recessed portions 82 is set larger than a moving range of the auxiliary protrusions 80 that move when the locking portions 32 move from the fixed position to the attaching and detaching position. When the locking portions 32 are in the fixed position, the auxiliary protrusions 80 are arranged along the upper edges of the housing recessed portions 82.

Removing Work for the Lamp Clips 30 is Explained Below.

When the reflection sheet 27 is slid from the initial position to the lower side, immediately after the start of the slide of the reflection sheet 27, the upper edges of the insertion holes 43 respectively come into contact with the upper edges of the base portions 32A of the locking portions 32 of the lamp clips 30. At the same time, the upper edges of the auxiliary holes 81 respectively come into contact with the upper edges of the auxiliary protrusions 80. The upper edges of the insertion holes 43 press the base portions 32A to the lower side (the attaching and detaching position side) according to the further slide of the reflection sheet 27. The upper edges of the auxiliary holes 81 press the auxiliary protrusions 80 to the lower side. Consequently, the base portions 32A of the locking portions 32 of the lamp clips 30 move from the locking holes 41 to the through-holes 42 side and reach the attaching and detaching position. The auxiliary protrusions 80 move downward in the housing recessed portions 82 and reach the lower end positions thereof (see FIGS. 37 and 38). Thereafter, the locking portions 32 are pulled to the front side from the chassis 22, whereby the removing work for all the lamp clips 30 attached to the chassis 22 is completed.

As explained above, in this embodiment, when the lamp clips 30 are removed, as in the first embodiment, the reflection sheet 27 is slid from the initial position and the lamp clips 30 are moved from the fixed position to the attaching and detaching position, whereby the locking portions 32 can be pulled out to the front side from the through-holes 42 and the insertion holes 43. Therefore, it is possible to easily remove the lamp clips 30.

In the lamp clips 30, the auxiliary protrusions 80 protruding to the reflection sheet 27 side are provided. In the reflection sheet 27, the auxiliary holes 81 engaging with the auxiliary protrusions 80 are provided. Consequently, when the reflection sheet 27 is slid, the insertion holes 43 push the locking portions 32 and, in addition, the auxiliary holes 81 push the auxiliary protrusions 80. Therefore, compared with the case in which only the insertion holes of the reflection sheet push the locking portions, force acting on the reflection sheet 27 can be dispersed. Therefore, it is possible to prevent damage and the like of the reflection sheet 27 and perform smooth slide operation of the reflection sheet 27. Therefore, it is possible to easily perform the removing work for the lamp clips 30.

The auxiliary protrusions 80 are set to a dimension further projecting to the chassis 22 side than the reflection sheet 27. The housing recessed portions 82 that house the protruding ends of the auxiliary protrusions 80 are provided in the chassis 22. Consequently, for example, even if the lamp clips 30 rise a little from the reflection sheet 27 when the lamp clips 30 move, it is possible to surely retain an engaged state of the auxiliary holes 81 and the auxiliary protrusions 80.

Sixth Embodiment

Figure 39:
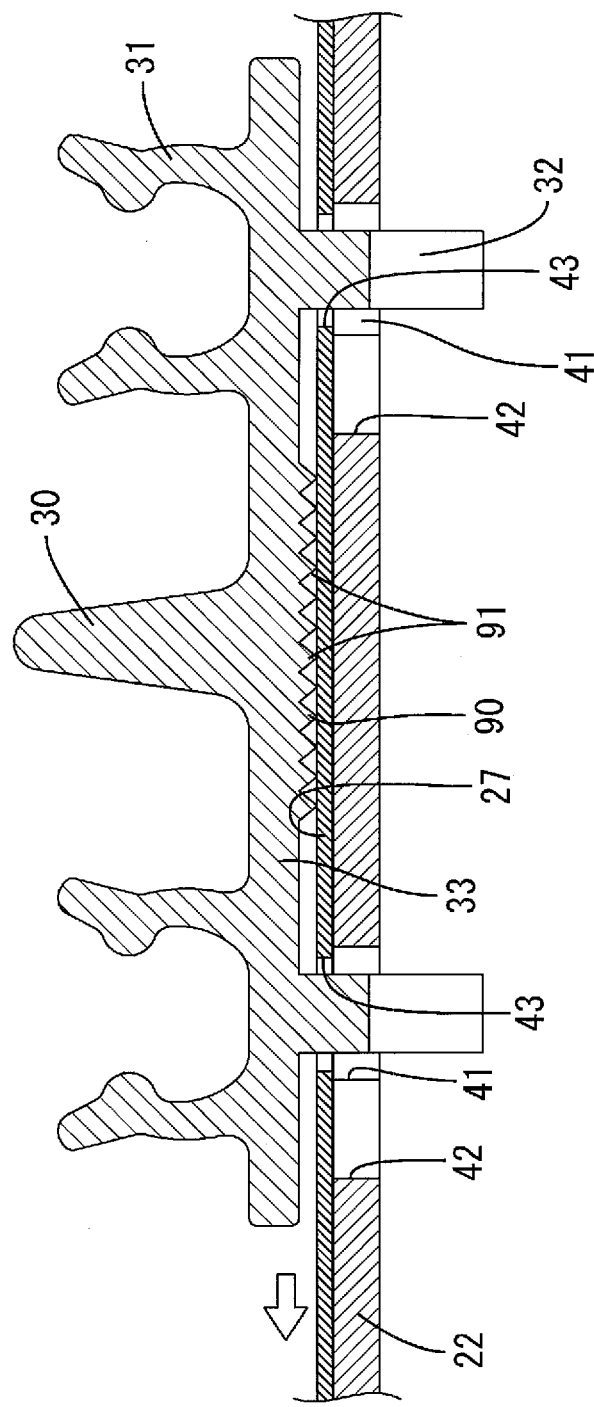
FIG. 39 is a partially enlarged sectional view showing a state in which locking portions of a lamp clip according to a sixth embodiment is arranged in the fixed position and a reflection sheet is arranged in the initial position.

A television receiver TV according to a sixth embodiment embodying the present invention is explained with reference to FIG. 39.

The television receiver TV according to this embodiment is different from the first embodiment in that an uneven contact portion 90 that assumes an uneven shape and is in contact with the reflection sheet 27 are provided on an opposed surface opposed to the reflection sheet 27 of the lamp clip 30. Components same as those in the first embodiment are denoted by the same reference numerals and signs and redundant explanation of the components is omitted.

The television receiver TV according to this embodiment includes, as in the first embodiment, the liquid crystal panel 11 and the backlight unit 20. The backlight unit 20 includes, as in the first embodiment, the chassis 22 on which the discharge tubes 21 are arranged on the front side, the reflection sheet 27 arranged between the discharge tubes 21 and the chassis 22, and the lamp clips 30 that retain the discharge tubes 21.

The lamp clip 30 includes, as in the first embodiment, the lamp gripping portions 31 that grip the discharge tubes 21, the locking portions 32 locked to the rear surface of the chassis 22, and the base part 33 that holds the chassis 22 and the reflection sheet 27 between the base part 33 and the locking portions 32.

In the lamp clip 30, the uneven contact portion 90 that assumes an uneven shape and is in contact with the reflection sheet 27 is provided. The uneven contact portion 90 is provided between a pair of locking portions 32 of the rear surface of the base part 33. The uneven contact portion 90 includes plural ridges 91 that assume a triangular shape in section and protrude to the rear side from the rear surface of the base part 33. The ridges 91 assume a shape extending in the lateral direction of the base part 33. The plural ridges 91 are arranged in parallel at a fixed pitch in the longitudinal direction of the base part 33. Protruding end edges of the ridges 91 are in parallel to one another. The protruding end edges of the ridges 91 are in contact with the surface of the reflection sheet 27 in a state in which the lamp clip 30 is attached to the chassis 22.

As explained above, in this embodiment, since the uneven contact portion 90 is in contact with the reflection sheet 27, frictional resistance increases between the lamp clip 30 and the reflection sheet 27 compared with the case in which the uneven contact portion 90 is not provided. Therefore, when the lamp clip 30 is removed, since the lamp clip 30 smoothly move along the sliding reflection sheet 27, it is possible to easily perform the removing work for the lamp clip 30.

Other Embodiments

The present invention is not limited to the embodiments explained in the above description and with reference to the drawings. For example, embodiments explained below are also included in the technical scope of the present invention.

(1) In the embodiments, when the lamp clip 30 is attached, the reflection sheet 27 is arranged in the initial position and the locking legs 32B are elastically deformed and pushed into the locking holes 41 from the insertion holes 43. However, a method of attaching the lamp clip 30 is not limited to this. For example, it is also possible that the reflection sheet 27 is arranged in the end position and, after the locking legs 32B are inserted into the through-holes 42 from the insertion holes 43 without being elastically deformed, the reflection sheet 27 is slid to the initial position side and the locking portions 32 are moved to the fixed position side to attach the lamp clip 30.

(2) In the embodiments, the locking legs 32B of the locking portion 32 are elastically deformed. However, the locking legs may be locking legs that are not elastically deformed. For example, the locking portions may have base portions that assume a columnar shape and the locking legs may assume a shape projecting from the base portions to the entire circumference.

(3) In the first embodiment, the reflection sheet 27 is slid to move the lamp clip 30 from the fixed position to the attaching and detaching position. However, the present invention is not limited to this. For example, the reflection sheet may be slid to move the lamp clips to a halfway position between the fixed position to the attaching and detaching position and, thereafter, separately move the lamp clips to the attaching and detaching position.

(4) In the first embodiment, when the reflection sheet 27 is in the initial position, the entire insertion holes 43 are shifted from the through-holes 42. However, the present invention is not limited to this. For example, a part of the insertion holes may be shifted from the through-holes and the through-holes may be partially covered with the reflection sheet to regulate passage of the locking portions.

(5) In the second embodiment, the insertion holes 50 have difference size in each of the insertion holes 50 formed in the predetermined region of the reflection sheet 27. However, the present invention is not limited to this. For example, the insertion holes 50 may have different size for each of lamp clips corresponding thereto.

(6) In the third embodiment, the moving direction from the fixed position to the attaching and detaching position side of the locking portions 32 is set in the opposite directions among the lamp clips 30. However, the moving direction may be any directions as long as the directions are different directions and, for example, may be directions substantially orthogonal to each other.

(7) In the fourth embodiment, the moving directions of the upper locking portions 32U and the lower locking portions 32S are the opposite directions. However, the moving directions may be any directions as long as the directions are different directions and, for example, may be directions orthogonal to each other.

(8) In the fifth embodiment, the housing recessed portions 82 are the holes piercing through the chassis 22. However, the present invention is not limited to this. The housing recessed portions 82 may be recesses formed on the surface of the chassis.

Figure 40:
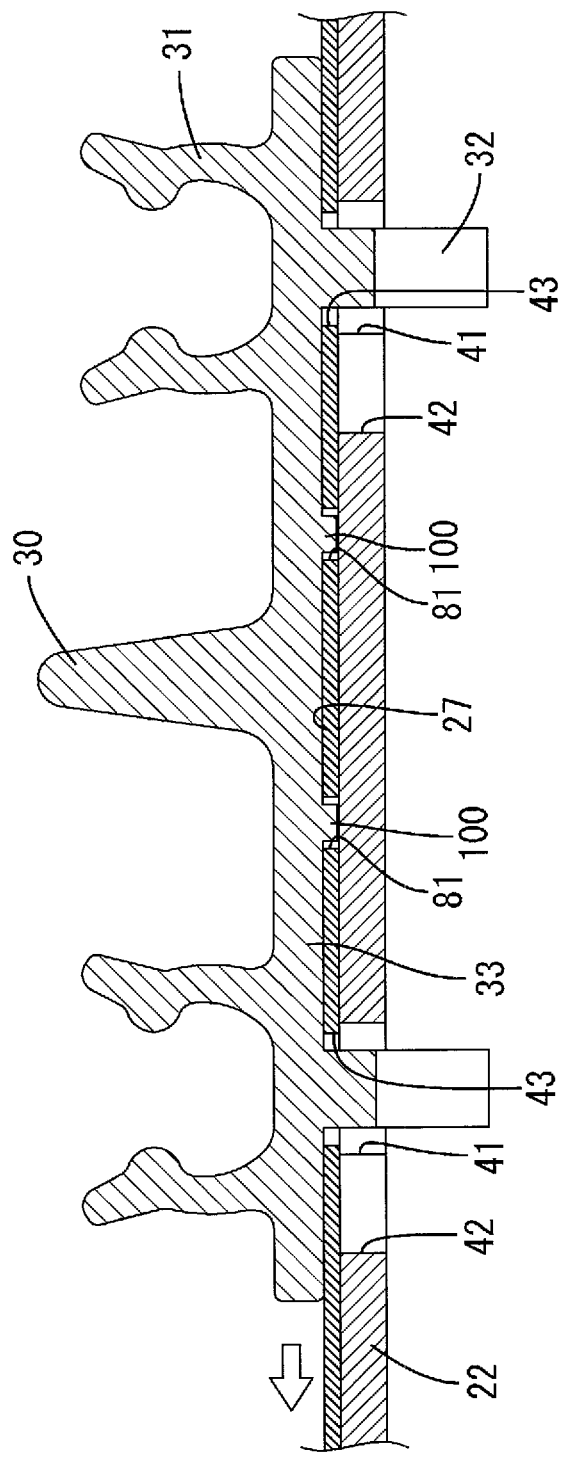
FIG. 40 is a partially enlarged sectional view showing a state in which locking portions of a lamp clip according to another embodiment (9) are arranged in the fixed position and a reflection sheet is arranged in the initial position.

(9) In the fifth embodiment, the auxiliary protrusions 80 are set to the dimension protruding to the chassis 22 side. However, the present invention is not limited to this. For example, as shown in FIG. 40, auxiliary protrusions 100 may be set to a dimension within the thickness of the reflection sheet 27 and not projecting to the chassis 22 side.

(10) In the sixth embodiment, the uneven contact portion 90 includes the plural ridges 91 assuming a triangular shape in section. However, the present invention is not limited to this. The uneven contact portion 90 may assume any configuration as long as frictional resistance between the uneven contact portion 90 and the reflection sheet increases. For example, uneven contact portion may include plural ridges assuming a polygonal shape in section or may include plural protrusions, recesses, or the like assuming a dot shape.

The invention claimed is:

1. An illumination device comprising:
a chassis housing a lamp that is arranged on a front side;
an optical sheet arranged between the lamp and the chassis; and
at least one lamp clip retaining the lamp, wherein
the lamp clip has at least one locking portion locked to a hole edge of a locking hole formed in the chassis from a rear side through an insertion hole formed in the optical sheet,
the chassis has a through-hole formed in a hole size larger than that of the locking hole and continuously from the locking hole,
the locking portion is allowed to move between a fixed position where the locking portion is located in the locking hole and an attaching and detaching position where the locking portion is located in the through-hole,
the insertion hole of the optical sheet is formed in a hole size larger than that of the locking hole, and
the optical sheet is allowed to slide in a direction along a moving direction of the locking portion from an initial position where the insertion hole communicates with the locking hole.

2. The illumination device according to claim 1, wherein the at least one locking portion includes a plurality of locking portions configured to move in the same moving direction from the fixed position toward the attaching and detaching position.

3. The illumination device according to claim 1, wherein the at least one lamp clip includes a plurality of lamp clips configured to move in the same moving direction from the fixed position toward the attaching and detaching position.

4. The illumination device according to claim 1, wherein the at least one lamp clip includes a plurality of lamp clips configured to move in different moving directions from the fixed position toward the attaching and detaching position.

5. The illumination device according to claim 1, wherein the at least one lamp clip includes a plurality of the lamp clips,
the optical sheet is set such that a hole edge of the insertion hole thereof on the rear side with respect to the slide direction is along an outer edge of the locking portion of each lamp clip on the rear side with respect to the moving direction toward the attaching and detaching position with the optical sheet in the initial position and the locking portion in the fixed position.

6. The illumination device according to claim 1, wherein
the at least one lamp clip includes a plurality of lamp clips, and
the optical sheet is set such that a distance between a hole edge of the insertion hole thereof on the rear side with respect to the slide direction and an outer edge of each lamp clip on the rear side with respect to the moving direction toward the attaching and detaching position is different from one lamp clip to another.

7. The illumination device according to claim 1, wherein the at least one locking portion includes a plurality of locking portions configured to move in different moving directions from the fixed position toward the attaching and detaching position.

8. The illumination device according to claim 1, wherein
the lamp clip includes a base portion sandwiching the chassis and the optical sheet with the locking portion, and
the through-hole is formed in an area of the chassis, the area to which a surface of the base portion corresponds with the locking portion in the fixing position.

9. The illumination device according to claim 1, wherein
the lamp clip has an auxiliary protrusion projecting toward the optical sheet is provided in the lamp clip, and
the optical sheet has an auxiliary hole in which the auxiliary protrusion is fitted.

10. The illumination device according to claim 9, wherein the auxiliary protrusion has a dimension so as to project toward the chassis further than the optical sheet, and the chassis has a housing recess that receives a distal end of the auxiliary protrusion.

11. The illumination device according to claim 1, wherein the lamp clip has an uneven contact portion having an uneven surface opposite the optical sheet and in contact with the optical sheet.

12. The illumination device according to claim 1, wherein the through-hole is formed in a size that allows the locking portion to pass therethrough in the front-back direction without being deformed.

13. The illumination device according to claim 1, wherein the insertion hole is formed in a size that allows the locking portion to pass therethrough in the front-back direction without being deformed.

14. The illumination device according to claim 1, wherein the lamp clip has a plurality of lamp gripping portions that grip the lamp, the lamp gripping portions being arranged in a direction that matches a moving direction in which the locking portion moves between the fixed position and the attaching and detaching position.

15. A display device comprising:
the illumination device according to claim 1; and
a display panel configured to provide display using light from the illumination device.

16. The display device according to claim 15, wherein the display panel is a liquid crystal panel including liquid crystal.

17. A television receiver comprising the display device according to claim 15.

* * * * *